US 8,385,943 B1

(12) United States Patent
Han et al.

(10) Patent No.: US 8,385,943 B1
(45) Date of Patent: Feb. 26, 2013

(54) METHOD AND APPARATUS FOR DETERMINING LOCATION INFORMATION OF A POSITION IN A MULTI-STOREY BUILDING

(75) Inventors: Yang Han, Singapore (SG); See Ho Ting, Singapore (SG)

(73) Assignee: YFIND Technologies Pte. Ltd., Singapore (SG)

( * ) Notice: Subject to any disclaimer, the term of this patent is extended or adjusted under 35 U.S.C. 154(b) by 0 days.

(21) Appl. No.: 13/505,656

(22) Filed: May 2, 2012

(51) Int. Cl.
*H04W 24/00* (2009.01)

(52) U.S. Cl. .............. 455/456.1; 455/404.2; 455/456.2; 455/456.3

(58) Field of Classification Search .... 455/456.1–456.6, 455/404.2, 422.1, 423, 425, 67.11
See application file for complete search history.

(56) References Cited

U.S. PATENT DOCUMENTS

| | | | |
|---|---|---|---|
| 6,664,925 B1 * | 12/2003 | Moore et al. ................. | 342/451 |
| 7,133,664 B2 * | 11/2006 | Bahl et al. .................. | 455/414.2 |
| 2004/0162084 A1 | 8/2004 | Wang | |
| 2008/0026770 A1 * | 1/2008 | Rudravaram et al. ...... | 455/456.1 |
| 2010/0008337 A1 | 1/2010 | Bajko | |
| 2010/0120422 A1 | 5/2010 | Cheung et al. | |

OTHER PUBLICATIONS

"International Application No. PCT/SG2011/000397, International Search Report and Written Opinion mailed Jan. 27, 2012", 9 pgs.

* cited by examiner

*Primary Examiner* — Kamran Afshar
*Assistant Examiner* — Dung Lam
(74) *Attorney, Agent, or Firm* — Schwegman Lundberg & Woessner, P.A.

(57) ABSTRACT

A method and apparatus for determining location information of a position in a multi-storey building, the method comprising: retrieving observation data comprising observed addresses and corresponding observed received signal strengths of wireless access points detected at the position from a memory; retrieving, for each storey of the building, a radio map comprising a plurality of location points in the respective storey of the building from a database, each location point comprising addresses and corresponding mean received signal strengths of wireless access points detected at the location point and coordinates of the location point; selecting one or more location points comprising the observed addresses from the radio map; determining a storey estimate of the position by calculating a sum probability for each storey of the building, the sum probability being calculated by summing all individual probabilities of each observed address contained in each selected location point in the radio map of the respective storey being detected on the respective storey; and setting the storey estimate as the storey of the building having highest value of the calculated sum probability, wherein each of said individual probabilities is calculated based on the corresponding observed received signal strength of said each observed address in said each selected location point and the corresponding mean received signal strength in said each selected location point containing said each observed address.

22 Claims, 15 Drawing Sheets

| OM | |
|---|---|
| MAC | RSS |
| $MAC_1$ | $RSS_1$ |
| $MAC_2$ | $RSS_2$ |
| ⋮ | ⋮ |
| $MAC_i$ | $RSS_i$ |
| ⋮ | ⋮ |

| FDMT | |
|---|---|
| MAC | FDM |
| $MAC_1$ | $FDM_1$ |
| $MAC_2$ | $FDM_2$ |
| ⋮ | ⋮ |
| $MAC_i$ | $FDM_i$ |
| ⋮ | ⋮ |

METHOD AND APPARATUS FOR DETERMINING LOCATION INFORMATION OF A POSITION IN A MULTI-STOREY BUILDING

PRIORITY CLAIM TO RELATED APPLICATIONS

This application is a national stage application under 35 U.S.C. §371 of PCT/SG2011/000397, filed Nov. 8, 2011, which application is incorporated by reference as if reproduced herein and made a part hereof in its entirety, and the benefit of priority of which is claimed herein.

FIELD OF THE INVENTION

The present invention relates to a method for determining location information of a position in a multi-storey building.

BACKGROUND

Location-based applications and services have been gaining popularity over the recent years with the widespread availability of Global Positioning System (GPS) functions in mobile devices, especially in smartphones. However, the low-cost solution with accurate positioning and convenience of the GPS functions are lost once the mobile device moves indoors into a building because when indoors, the GPS satellite signals becomes undetectable.

In today's cities where people spend a great amount of time indoors, such as in shopping malls, airports, office buildings, hospitals and industrial plants, there is a need for an extension of positioning capabilities for indoors. Having accurate indoors positioning capabilities can allow companies to improve their indoor workflows, processes, security management, assets and people tracking, customer satisfaction and carry out perhaps many other innovative ideas presently not thought of.

Although there are a number of indoor wireless positioning solutions available on the market, most of them require the deployment of dedicated equipment, making them too expensive for mass-market implementation.

SUMMARY

According to one aspect of the present invention, there is provided a method for determining location information of a position in a multi-storey building, the method comprising: retrieving observation data comprising observed addresses and corresponding observed received signal strengths of wireless access points detected at the position from a memory; retrieving, for each storey of the building, a radio map comprising a plurality of location points in the respective storey of the building from a database, each location point comprising addresses and corresponding mean received signal strengths of wireless access points detected at the location point and coordinates of the location point; selecting one or more location points comprising the observed addresses from the radio map; determining a storey estimate of the position by calculating a sum probability for each storey of the building, the sum probability being calculated by summing all individual probabilities of each observed address contained in each selected location point in the radio map of the respective storey being detected on the respective storey; and setting the storey estimate as the storey of the building having highest value of the calculated sum probability, wherein each of said individual probabilities is calculated based on the corresponding observed received signal strength of said each observed address in said each selected location point and the corresponding mean received signal strength in said each selected location point containing said each observed address.

The method may further comprise determining a position estimate of the position based on weighted average values of coordinates of every selected location point containing said each observed address in the radio map of the estimated storey.

The selected one or more location points may be selected from a filtered region of interest in the radio map in the step of selecting one or more location points comprising the observed addresses from the radio map.

The method may further comprise extracting a number of observed addresses with corresponding received signal strengths above a predetermined value.

The observed addresses that are not extracted may be removed from the selected one or more location points.

The region of interest in the radio map may be filtered based on vicinity of a previous position in a multi-storey building.

The step of determining a storey estimate of the position may comprise calculating, using a Probability Density Function, a first value indicative of probability of a first selected location of the selected location points being the position of the mobile device, based on the corresponding observed received signal strength of a first observed address in the first selected location point and the corresponding mean received signal strength in the first selected location point containing the first observed address; calculating the first value for each one of the selected location points; summing up first values calculated for the selected location points in the radio map of one storey, wherein said selected location points all contain a common observed address, to get a second value; and calculating the second value for every observed address that is common; summing up second values calculated for each storey of the building to get a third value; and selecting the largest third value as the storey estimate.

The method may further comprise selecting the observed addresses with variance of detected received signal strengths that is beyond a predetermined variance from the radio map of each storey in the building; and in the step of selecting one or more location points comprising the observed addresses from the radio map, selecting the one or more location points comprising the selected observed addresses with variance of detected received signal strengths that is beyond the predetermined variance.

The method may further comprise receiving observation data wirelessly from a mobile device located at the position in the building, the observation data comprising observed addresses and corresponding observed received signal strengths of wireless access points detected by the mobile device at the position.

The method may further comprise detecting observation data at the position, the observation data comprising observed addresses and corresponding observed received signal strengths of wireless access points detected.

The method may further comprise repeating said step of determining the storey estimate a predetermined number of times based on more than one observation data to collect more than one preliminary storey estimate; and selecting as the storey estimate the same storey having the largest third value in the predetermined number of times.

According to another aspect of the present invention, there is provided an apparatus comprising: a memory for storing observation data comprising observed addresses and corresponding observed received signal strengths of wireless access points detected at the position; a database for storing, for each storey in the building, a radio map comprising a plurality of location points in the respective storey of the building, each location point comprising addresses and mean corresponding received signal strengths of wireless access points detected at the location point and coordinates of the location point; and a processing unit for selecting one or more location points comprising the observed addresses from the radio map; the processing unit being configured for determining a storey estimate of the position by calculating a sum probability for each storey of the building, the sum probability being calculated by summing all individual probabilities of each observed address contained in each selected location point in the radio map of the respective storey being detected on the respective storey, and setting the storey estimate as the storey of the building having highest value of the calculated sum probability, wherein each of said individual probabilities is calculated based on the corresponding observed received signal strength of said each observed address in said each selected location point and the corresponding mean received signal strength in said each selected location point containing said each observed address.

The processing unit may be further configured for determining a position estimate of the position based on weighted average values of coordinates of every selected location point containing said each observed address in the radio map of the estimated storey.

The selected one or more location points may be selected from a filtered region of interest in the radio map in the step of selecting one or more location points comprising the observed addresses from the radio map.

The processing unit may be further configured for extracting a number of observed addresses with corresponding received signal strengths above a predetermined value.

The observed addresses that are not extracted may be removed from the selected one or more location points.

The region of interest in the radio map may be filtered based on vicinity of a previous position in a multi-storey building.

The step of determining a storey estimate of the position may comprise calculating, using a Probability Density Function, a first value indicative of probability of a first selected location of the selected location points being the position of the mobile device, based on the corresponding observed received signal strength of a first observed address in the first selected location point and the corresponding mean received signal strength in the first selected location point containing the first observed address; calculating the first value for each one of the selected location points; summing up first values calculated for the selected location points in the radio map of one storey, wherein said selected location points all contain a common observed address, to get a second value; calculating the second value for every observed address that is common; summing up second values calculated for each storey of the building to get a third value; and selecting the largest third value as the storey estimate.

The processing unit may be further configured for selecting the observed addresses with variance of detected received signal strengths that is beyond a predetermined variance from the radio map of each storey in the building; and in the step of selecting one or more location points comprising the observed addresses from the radio map, selecting the one or more location points comprising the selected observed addresses with variance of detected received signal strengths that is beyond the predetermined variance.

The apparatus may comprise a receiver for receiving the observation data wirelessly from a mobile device located at the position in the building.

The apparatus may comprise a detector for detecting the observation data from the position.

The processing unit may be further configured for repeating said step of determining the storey estimate a predetermined number of times based on more than one observation data to collect more than one preliminary storey estimate; and selecting as the storey estimate the same storey having the largest third value in the predetermined number of times.

BRIEF DESCRIPTION OF THE DRAWINGS

Embodiments of the invention will be better understood and readily apparent to one of ordinary skill in the art from the following written description, by way of example only and in conjunction with the drawings, in which:

FIG. 5 shows a table containing data of an Observation Matrix (OM) of the system.

FIG. 6 shows a table containing data of a Floor Discrimination Metric Table (FDMT) of the system.

DETAILED DESCRIPTION

Figure 1:
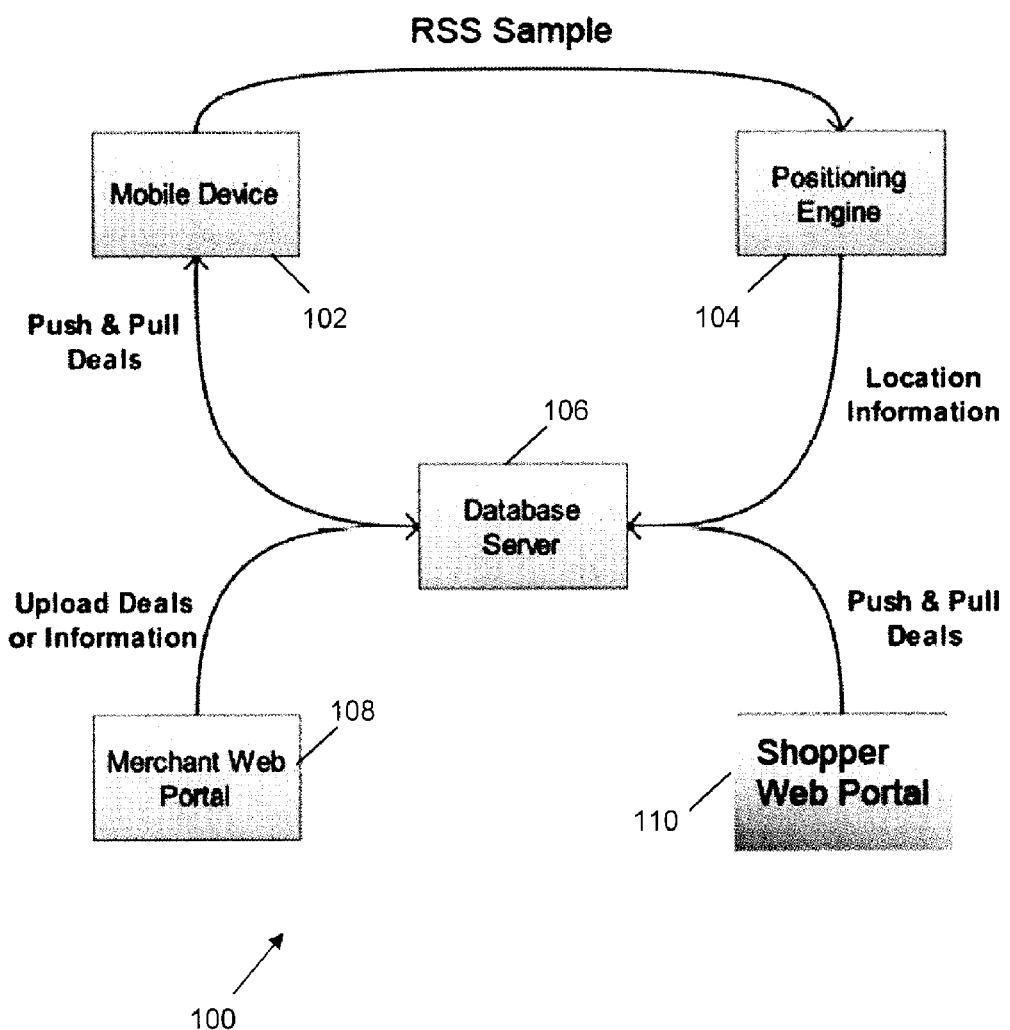
FIG. 1 shows a schematic diagram of an application of an indoor positioning system.

In FIG. 1, there is provided a system 100, which includes a mobile device 102, a positioning engine 104, a database server 106, a merchant web portal 108 and a shopper web portal 110.

Operation of the system 100 is as follows.

Client based software implemented in the form of a mobile application is firstly downloaded and installed by a user on the mobile device 102 via a telecommunication link such as a Third Generation (3G) telecommunication network, a General Packet Radio Service (GPRS) data link and the like ("telecommunication link"). The mobile device 102 could be a Wireless Fidelity (WiFi) enabled smart phone, touchscreen tablet, computer notebook, computer netbook and the like. The mobile application is configured to exchange data with the database server 106 and the positioning engine 104. The mobile application is used for detecting position of the mobile device 102 inside a building.

When activated at any location in the building, the mobile application makes use of a WiFi interface of the mobile device 102 to extract Received Signal Strength (RSS) Indicator values of all visible surrounding WiFi access points. An access point (also known as wireless access point) is visible to the mobile device 102 if its WiFi signals can be detected by the mobile device 102. Each access point is indicated by a Media Access Control (MAC) address and has an RSS value denoting the signal strength of the access point as picked up by the mobile device 102.

The RSS value and the MAC address of each detected access point are tabulated. The table of RSS values and corresponding Media Access Control (MAC) addresses of the access points is then transmitted to the Positioning engine 104. The transmission is done via a telecommunication link. Upon receiving the MAC and RSS values from the mobile device 102, the positioning engine 104 will calculate an estimated indoor location of the mobile device 102 and send the location information to the database server 106. The indoor location of the mobile device 102 includes the floor of the building it is on and the position estimate of the mobile device 102 on that floor.

After the database server 106 receives the estimated indoor location of the mobile device 102, the database server 106 may push advertising/marketing information to the mobile device 102 via a telecommunication link according to the estimated indoor location, time, user's preset preferences and business logic determined by merchants. It is appreciated that besides pushing advertising/marketing information to the mobile device 102, other types of information can be pushed/extracted from the mobile device 102, or actions can take place after the database server 106 receives the estimated indoor location of the mobile device 102.

In the system 100, the merchant web portal 108 allows each merchant to create his/her own personal accounts. Through the personal accounts, each merchant will be able to upload and publish their advertising/marketing materials in real-time. In addition, the merchant will be able to set the business logic to be used for pushing their deals and download the analytics on the number of impressions served, number of clicks, footfall etc.

The shopper web portal 110 provides information and services also available in the mobile application on a web page. Through the web page, a user will be able to create a personal account and select his/her shopping preferences that will affect the types of advertising/marketing materials to be sent to him/her. In the shopper web portal 110, the user will also be able to maintain a microblog.

Advantageously, the system 100 provides an indoor positioning and navigation technology that taps on existing WiFi networks already installed in most modern buildings. Minimum resource is deployed in this instance, that is, the database server 106 and the positioning engine 104 are required for predicting the position estimate of the mobile device (102 in FIG. 1). Cost is kept low and the technology is more scalable and accessible for the mass-market and industries.

It is appreciated that although the merchant web portal 108 and the shopper web portal have been described, the indoor positioning aspect of the system 100 is generic and can be used in other areas such as for people/asset tracking or in awareness interactive multimedia applications and services. Examples of application areas for the indoor positioning aspect of the system 100 are as follows.

For tracking people and assets for enterprises, such as hospitals, airports, shopping malls and office buildings.

To serve purely as a backbone indoor positioning and navigation engine for mobile device application developers to create location-based applications.

To serve as the underlying technology for the implementation of a mobile marketing platform for mega shopping malls, with full navigational capabilities and intelligent pushing of advertisements based on time, location and shopper's preferences.

Details of the indoor positioning aspect of the system 100 are described as follows.

Figure 2:
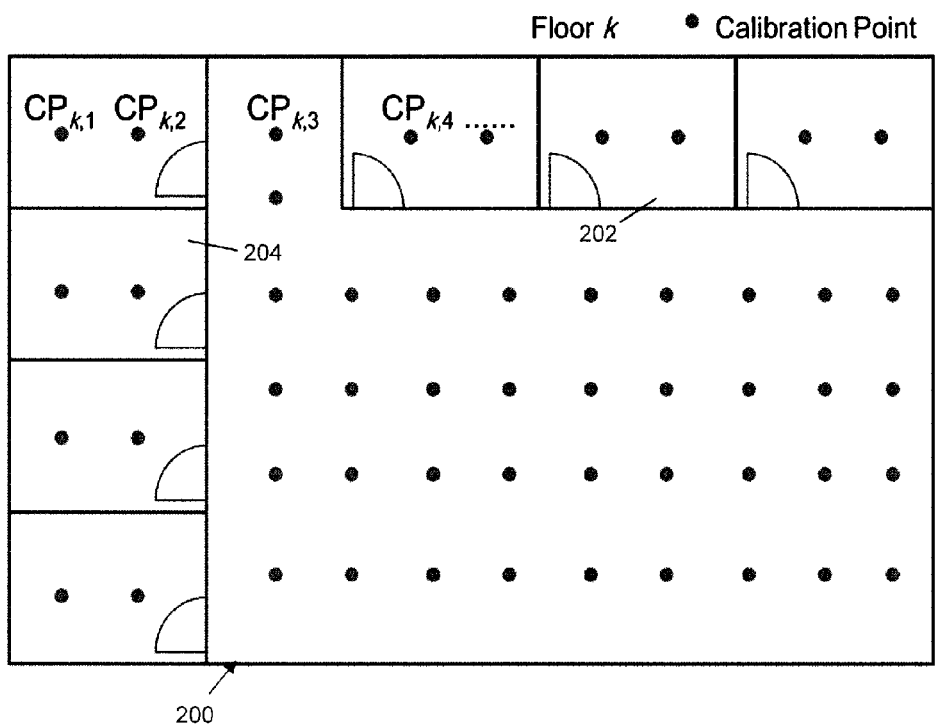
FIG. 2 shows a floor plan representing a Radio Map of a floor of a multi-storey building.

In FIG. 2, there is provided a rectangular top view floor plan 200 of an arbitrary floor or storey, k, in a subject multi-storey building. For a system such as system 100 described as in FIG. 1 to function for the building, each floor or storey of the building would require a Radio Map (RM). It is noted that in the present specification, the words 'floor' and 'storey' have the same meaning and are used interchangeably.

FIG. 2 illustrates conceptually a radio map for the arbitrary kth floor, $RM_k$. In practice, each radio map contains data of a list of calibration points for a specific floor of the building. The data of every radio map is stored in the database server (106 in FIG. 1) and is used for locating the mobile device (102 in FIG. 1) in the building.

The $RM_k$ is created by determining the list of calibration points on the kth floor through onsite measurements with a measuring device. The measuring device could be a WiFi enabled smart phone, touchscreen tablet, computer notebook, computer netbook and the like.

Each calibration point (CP) is characterized by the following information:

1) XY co-ordinates with respect to horizontal (X) and vertical (Y) axes of the floor plan 200 indicating the physical location of the selected CP in the form (x, y).

2) A list of MAC addresses of WiFi access points detected during the onsite measurements at the location of the CP and a list of mean Received Signal Strength values, mRSS associated with the MAC addresses. It is noted that each MAC address would only have one corresponding mRSS value. Each of the mRSS values is calculated by averaging a few measurements of received signal strength values detected by the measuring device.

The choice of the position of the calibration points is determined based on, for instance, i) accuracy of the location information required of the mobile device 102, ii) complexity of the environment and iii) physical layout.

In relation to i), generally, the closer the calibration points are together the better the accuracy of the radio map for purposes of locating the position of the mobile device 102 in the radio map of the arbitrary kth floor. However, it is noted that if the calibration points are too close, calibration time and cost are increased without improvement to the positioning accuracy.

For ii), while it may be better to evenly distribute calibration points in the radio map with equal distances from each other to ease computation of the position of the mobile device 102, there are times that even distribution may not provide the desired accuracy in the computation due to environmental factors, for instance, proximity to a source of WiFi signal interference. In such cases, even distribution of the calibration points is not possible.

With regard to iii), physical layout such as location of building walls and floor design also affects the placement of the calibration points.

An example range of the distance between calibration points is 2 to 5 meters.

In FIG. 2, there are 7 rooms arranged along the rectangular sides of the floor plan 200. 3 rooms 202 are horizontally arranged and 4 rooms 204 are vertically arranged in the floor plan. Due to obstruction by the walls of the rooms, the calibration points are selected such that they are evenly distributed inside and outside the rooms.

Figure 3:
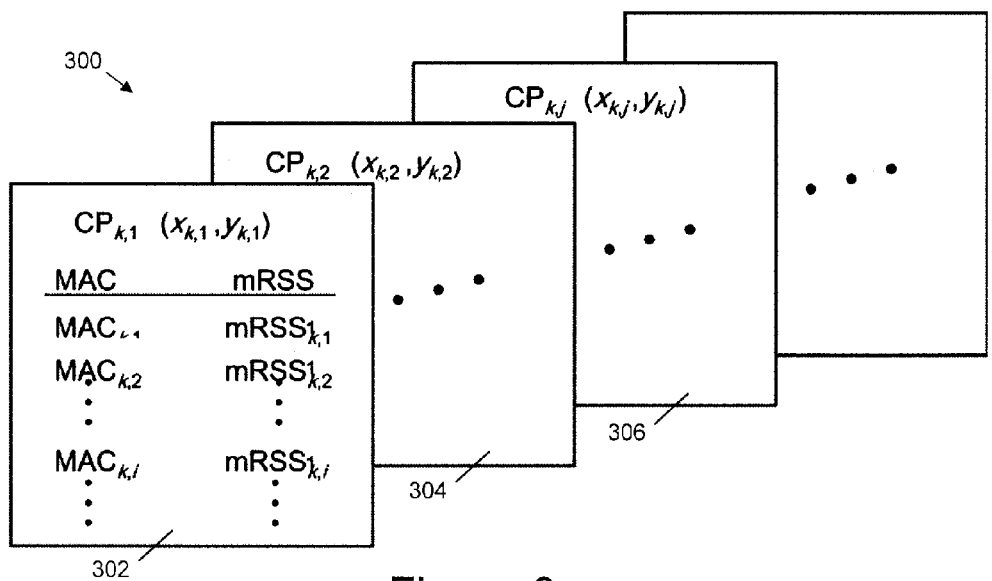
FIG. 3 shows a plurality of tables containing data of Calibration Points of the system.

FIG. 3 illustrates conceptually the multi-dimensional format of data in an $RM_k$ 300. The $RM_k$ 300 contains a list of calibration points, i.e. $CP_{k,1}$ 302 with coordinates $(x_{k,1}, y_{k,1})$, $CP_{k,2}$ 304 with coordinates $(x_{k,2}, y_{k,2})$ ... $CP_{k,j}$ 306 with coordinates $(x_{k,j}, y_{k,j})$ for the arbitrary kth floor. $CP_{k,1}$ in turn contains a list of detected WiFi access points $MAC_{k,1}$, $MAC_{k,2}$, ... $MAC_{k,i}$ and the corresponding $mRSS_{k,1}$, $mRSS_{k,2}$, ... $mRSS_{k,i}$ measured at coordinate $(x_{k,1}, y_{k,1})$. It is noted that k is indicative of the building floor and j denotes which Calibration Point in the Radio Map.

Figure 4:
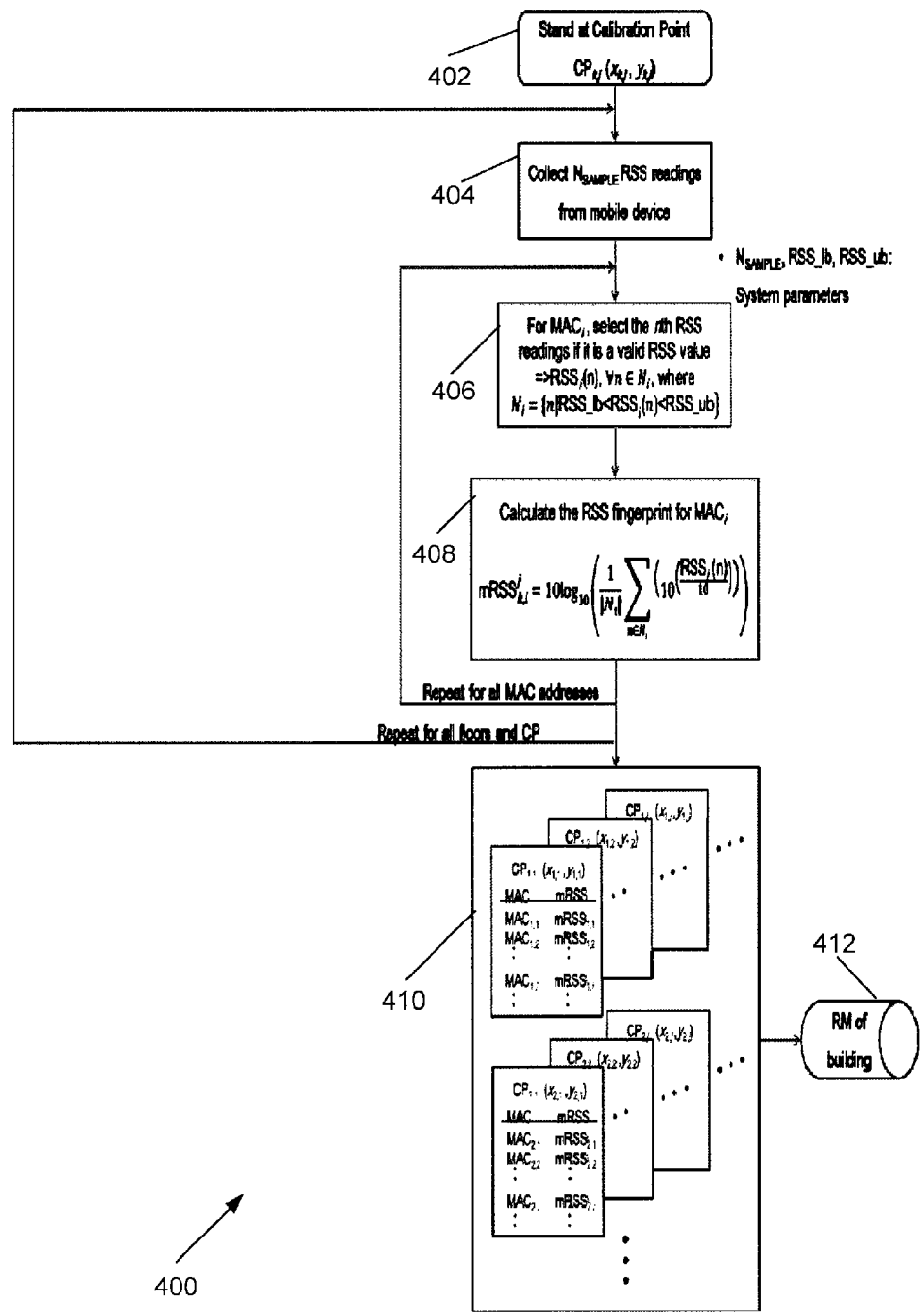
FIG. 4 shows a flowchart for generating a Radio Map of a multi-storey building.

FIG. 4 illustrates a measurement procedure 400 to get the Radio Map of the multi-storey building 412. The Radio Map of the multi-storey building 412 includes a Radio Map for each floor 410.

At step 402, a person performing the measurement procedure holds a measuring mobile device and stands at a predetermined Calibration Point, $CP_{k,j}$ $(x_{k,j}, y_{k,j})$.

At step 404, a predetermined N number of samples of RSS readings, $N_{SAMPLE}$, is collected from the measuring mobile device for each MAC address detected. It is noted that each MAC address is linked to an access point. $N_{SAMPLE}$ is a value selected based on the variance of WiFi signals in the specific environment. It could be in the range of, for instance, 10 to 100 depending on how large the variance of the WiFi signals are and the sampling rate achievable by the hardware of the measuring mobile device. Generally, the larger the variance, the more the samples of RSS readings are required (i.e. higher $N_{SAMPLE}$). The variance of the WiFi signals could be calculated, for instance, by collecting samples of WiFi signals in the specific environment, calculating the mean WiFi signal from data of the samples collected and applying standard variance formulas of the probability theory.

At step 406, a set of predetermined nth number of RSS readings is selected from the collected $N_{SAMPLE}$ for a particular MAC address, $MAC_i$, detected by the measuring mobile device at step 404. This set of predetermined nth number of RSS readings is denoted by the expression, $RSS_i(n)$, and i denotes which particular MAC address.

An RSS reading is selected for the set, $RSS_i(n)$, only if it is deemed to be a valid RSS value. An RSS value is deemed valid only if it is greater than a predetermined RSS lower limit value, RSS_lb, and lower than a predetermined RSS upper limit value, RSS_ub. An RSS reading of a MAC address below RSS_lb is considered to be too weak to be used for locating the position of the mobile device (102 in FIG. 1) in the building. Conversely, an RSS reading of a MAC address above RSS_ub is considered to be too strong to be used for locating the position of the mobile device (102 in FIG. 1) in the building.

Hence, $RSS_i(n)$ is a set of RSS values for all (i.e. $\forall$) instances where n is an element of (i.e. $\in$) $N_i$, where $N_i$ is a set of all n values when $RSS_i(n)$ fulfils the condition of RSS_lb<$RSS_i(n)$<RSS_ub. Mathematically, the relationship can be represented as follows.

$$RSS_i(n), \forall n \in N_i, \text{ where } N_i = \{n | RSS\_lb < RSS_i(n) < RSS\_ub\}$$

At step 408, the calculated $RSS_i(n)$ and $N_i$ values in step 406 for a particular MAC address, $MAC_j$, detected at a Calibration Point, $CP_j$, in a Radio Map for floor k, $RM_k$, are used to calculate an RSS fingerprint or in other words a mean Received Signal Strength value, mRSS, according to the following formula.

$$mRSS_{k,i}^j = 10\log_{10}\left\{\frac{1}{|N_i|}\sum_{n \in N_i}\left[10^{\left(\frac{RSS_i(n)}{10}\right)}\right]\right\} \quad \text{(Unit: dBm)}$$

In mathematical terms, the formula above converts all the collected RSS values i.e. $RSS_i(n)$ as and when they are collected from logarithm domain into linear domain. It also calculates the arithmetic mean of the collected RSS values in the linear domain and converts the calculated arithmetic mean value back into the logarithm domain. The averaging for the mean value calculation has to be done in the linear domain because the mean value in logarithm domain does not have a physical meaning.

Steps 406 and 408 are repeated to acquire the mRSS values for all MAC addresses detected by the measuring mobile device for a particular Calibration Point in a radio map of a particular floor.

Steps 402, 404, 406 and 408 are repeated for all floors and for all Calibration Points in the radio map of each floor to gather all the data to form the Radio Map of the multi-storey building 412.

With reference to FIG. 5, whenever the mobile application described with reference to FIG. 1 is activated by a user to locate the position of the mobile device (102 in FIG. 1), the mobile device (102 in FIG. 1) will be instructed by the mobile application to scan the surroundings to acquire data for the construction of an Observation Matrix (OM) 502. The OM 502 contains a list of all the MAC addresses and Received Signal Strengths (RSS) of the WiFi access points detected during the scan. The OM 502 constructed in this manner would be representative of the position of the mobile device (102 in FIG. 1) and can be used to predict the position of the mobile device (102 in FIG. 1). It is noted that unlike a Calibration point (CP), the RSS value in the OM 502 is not a mean value.

After the OM 502 is constructed, it would be sent to the database server (106 in FIG. 1) for further processing. The OM 502 could be constructed by the mobile device (102 in FIG. 1) on request by the database server (106 in FIG. 1).

FIG. 6 illustrates a Floor Discrimination Metric Table (FDMT) 602. The FDMT 602 is used in a Floor Selection Algorithm (900 in FIG. 9) for detecting the floor on which the mobile device (102 in FIG. 1) is located when the mobile application described previously is executed to locate the position of the mobile device (102 in FIG. 1). The FDMT 602 contains all the MAC addresses present in all radio maps constructed for each floor of the subject multi-storey building. Corresponding to each MAC address is a Floor Discrimination Metric value (FDM). The FDM is calculated as follows.

$$FDM_i = \frac{\text{(variance of } RSS \text{ for a specific } MAC_i \text{ across all floors)}}{\sum_{k}^{n} \text{(variance of } RSS \text{ for the specific } MAC_i \text{ in Floor } k)}$$

i.e.

$$FDM_i = \frac{\frac{1}{\sum_{k=1}^{n} q_k} \sum_{k=1}^{n} \sum_{j=1}^{q_k} (mRSS_{k,i}^j - MRSS_i)^2}{\sum_{k=1}^{n} \frac{1}{q_k} \sum_{j=1}^{q_k} (mRSS_{k,i}^j - MRSS_{k,i})^2}$$

where k is indicative of a specific floor in the building,
n is the number of floors in the multi-storey building, and $$\sum_{k}^{n} \text{(variance of } RSS \text{ for the specific } MAC_i \text{ in Floor } k)$$

is the sum of individual variances of the specific $MAC_i$ in each floor in the multi-storey building.

$q_k$ is the number of Calibration Points in Floor k.
$MRSS_{k,i}$ is the mean of the RSS of a specific $MAC_i$ in floor k
i.e.

$$MRSS_{k,i} = \frac{1}{q_k} \sum_{j=1}^{q_k} mRSS_{k,i}^j$$

$MRSS_i$ is the mean of the RSS of a specific $MAC_i$ across all floors
i.e.

$$MRSS_i = \frac{1}{n} \sum_{k=1}^{n} MRSS_{k,i}$$

Variance of the RSS for the specific $MAC_i$ in floor k is thus represented as $$\frac{1}{q_k} \sum_{j=1}^{q_k} (mRSS_{k,i}^j - MRSS_{k,i})^2$$

and the variance of the RSS for the specific $MAC_i$ across all floors, $FDM_i$, is represented by the formula above.

The numerator of $FDM_i$ i.e. variance of RSS for $MAC_i$ across all floors indicates how different is the RSS received from the $MAC_i$ at different floors. The greater the difference, the better is $MAC_i$'s floor discrimination ability. The denominator of $FDM_i$ is for normalization purposes.

Hence, based on the formula, the FDM value for a specific MAC address is basically an indication of how well the device of the specific MAC address is able to tell the floor on which the mobile device (102 in FIG. 1) is located when the mobile application described previously is executed to locate the position of the mobile device (102 in FIG. 1). In the present instance, the higher the FDM value of a specific MAC address, the better indicator it is.

Figure 7:
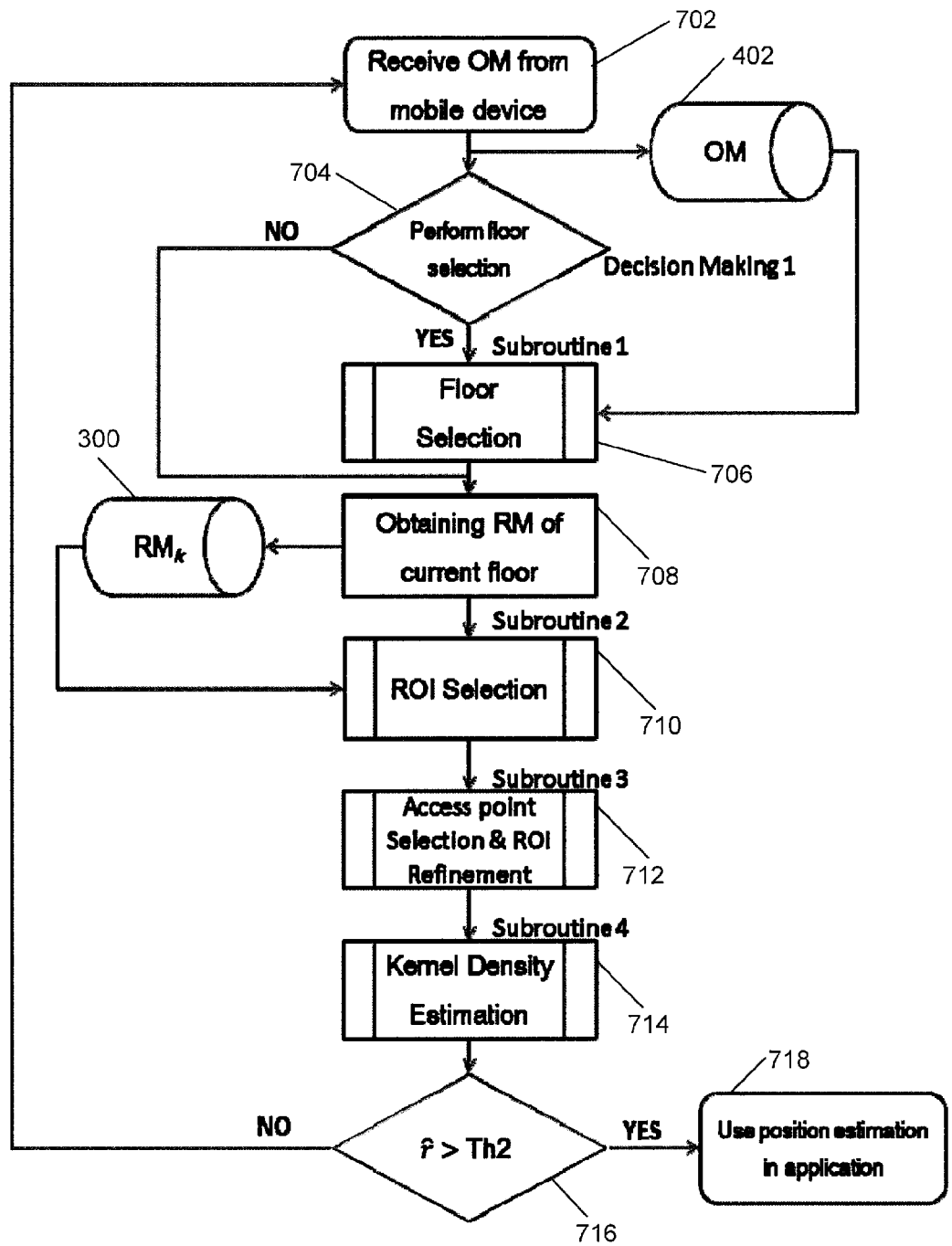
FIG. 7 shows a flowchart of the operation of the indoor positioning system.

FIG. 7 shows in detail a main flowchart 700 of a main application running on the database server (106 in FIG. 1) to locate the position of the mobile device (102 in FIG. 1).

At step 702, an OM (e.g. 502 in FIG. 5) is received by the database server (106 in FIG. 1) from the mobile device (102 in FIG. 1) requesting for information on its location via a telecommunication link.

At step 704, a Floor selection subroutine is run on the database server (106 in FIG. 1). When the Floor selection subroutine is run, a check on whether a Floor selection Algorithm needs to be run another time at step 706 to derive a floor selection decision is performed. If the accuracy requirements of the check are met, a final floor selection decision would be derived. If the accuracy requirements of the check are not met, the Floor selection Algorithm of step 706 needs to be run again based on another OM (e.g. 502 in FIG. 5) requested from the mobile device (102 in FIG. 1). Data of a floor selection decision could be just the decided floor number. Details of the Floor selection subroutine would be described later with reference to FIGS. 8, 9 and 10.

Each OM (e.g. 502 in FIG. 5) received at step 702 is used in the Floor selection subroutine to derive a floor selection decision of the floor on which the mobile device (102 in FIG. 1) is located. In the case that the accuracy requirements of the check on whether the Floor selection Algorithm at step 706 needs to be run another time are not met, the Floor selection subroutine may request for more OM (e.g. 502 in FIG. 5) obtained at the position of the mobile device (102 in FIG. 1) for processing to provide more accurate prediction of the floor on which the mobile device (102 in FIG. 1) is located. Hence, steps 702 and 704 may be repeated several times depending on the number of requests from the Floor selection subroutine.

At step 708, the RM of the floor k recorded in step 706 is obtained from a database of the database server (106 in FIG. 1). The $RM_k$ 300 described with reference to FIG. 3 of floor k is, if possible, used by a Region Of Interest (ROI) selection subroutine to determine a narrowed ROI in the $RM_k$ 300 in which the mobile device (102 in FIG. 1) is most likely to be located. The OM (502 in FIG. 5) received at step 702 is also used in the ROI selection subroutine. Details of the ROI selection subroutine would be described later with reference to FIGS. 11 and 12.

Upon ROI selection completion at step 710, data of the selected ROI in which the mobile device (102 in FIG. 1) is most likely located is recorded.

At step 712, access points in the OM (e.g. 502 in FIG. 5) most suitable for locating the position of the mobile device (102 in FIG. 1) are selected. At this step, the selected ROI is also refined, if possible, to an even narrower ROI, which the mobile device (102 in FIG. 1) is most likely to be located in.

After the access points that are most suitable for locating the position of the mobile device (102 in FIG. 1) are selected and the ROI is refined, if possible, at step 712, a position estimate subroutine is run at step 714 to conduct Kernel Density Estimation (KDE) for deriving a position estimate, (x', y'), of the mobile device (102 in FIG. 1) and a reliability value, r', that is a variance value indicative of the reliability of the position estimate. Details of the position estimate subroutine would be described later with reference to FIG. 15.

At step 716, the reliability value, r', is compared against a predetermined threshold value, Th2. If it is greater than Th2, the position estimate, (x', y'), of the mobile device (102 in FIG. 1) is regarded as accurate and it would be recorded and used as the position estimate of the mobile device (102 in FIG.

1) at step 718. If r' is equal to or lesser than Th2, the main application would request for a new OM (e.g. 502 in FIG. 5) to be retrieved from the mobile device (102 in FIG. 1) and steps 702 to 716 would be run again using data of the new OM (e.g. 502 in FIG. 5). Th2 describes the maximum acceptable variance of the position estimate of the mobile device (102 in FIG. 1). It could be in the range of 10 to 50 depending on the distance between the calibration points of the radio map of the floor k selected at step 706 and the prediction accuracy desired for estimating the position of the mobile device. The lesser the Th2 value, the more accurate it gets.

Figure 8:
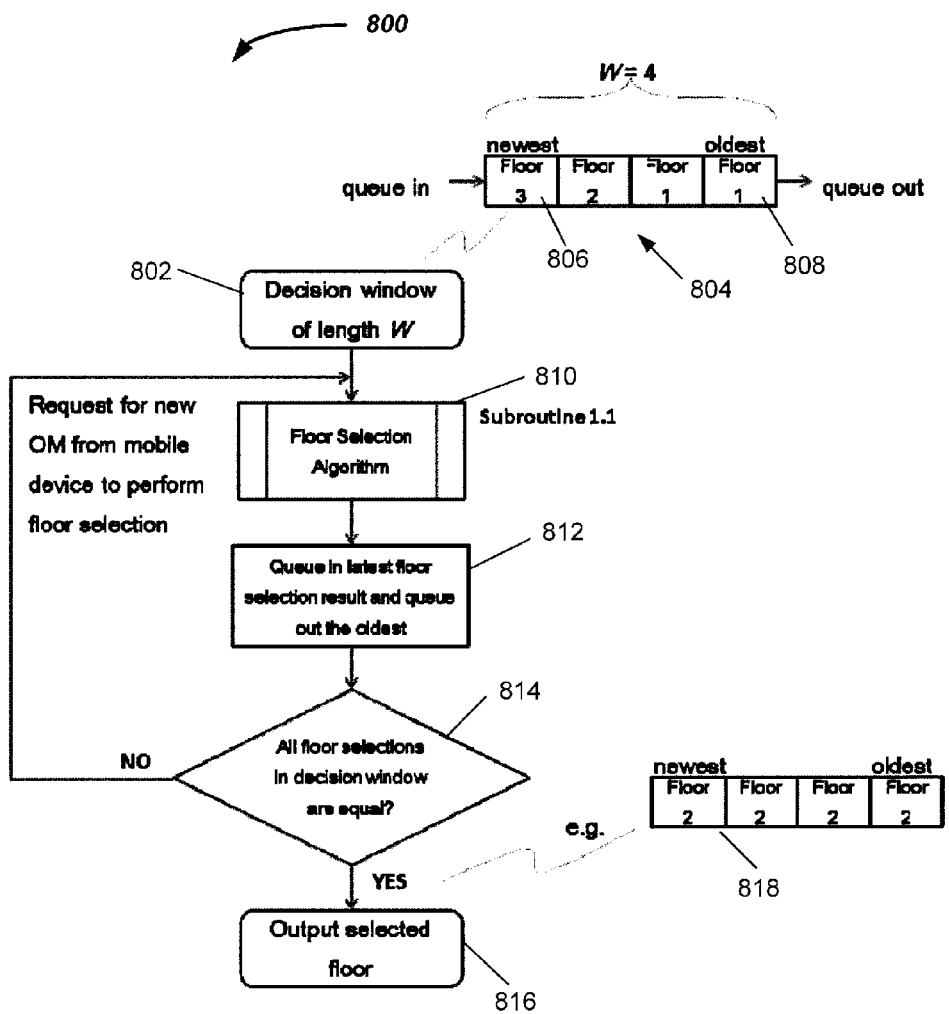
FIG. 8 shows a flowchart of a floor selection subroutine of the system.

FIG. 8 shows a flowchart of the Floor selection subroutine 800 described with reference to steps 704 and 706 in FIG. 7. The Floor selection subroutine 800 is responsible for deciding on a final floor selection after checking a predetermined number of floor selection decisions derived based on different OMs (e.g. 502 in FIG. 5) acquired for a particular position of the mobile device (102 in FIG. 1). Each floor selection decision is a decision on the floor that the mobile device (102 in FIG. 1) is most likely on. The predetermined number of floor selection decisions is indicated by length W of a decision window 802.

Each floor selection decision is determined or derived based on an OM (e.g. 502 in FIG. 5) requested from the mobile device (102 in FIG. 1). The data of the OMs (e.g. 502 in FIG. 5) requested may differ from one another due to factors affecting the measurements undertaken by the mobile device (102 in FIG. 1) when it is obtaining the OMs (e.g. 502 in FIG. 5). For instance, one such factor may be environmental conditions affecting the WiFi reception of the mobile device (102 in FIG. 1) or the WiFi service provision of the access points detectable at the position of the mobile device (102 in FIG. 1). Hence, having the Floor selection subroutine 800 to make a final floor selection decision based on more than one floor selection decision for one position of the mobile device (102 in FIG. 1) can help to acquire more accurate prediction of the floor that the mobile device (102 in FIG. 1) is on at that position.

In the Floor selection subroutine 800, W is 4. It is appreciated that the number of W could be 1 or more depending on the extent of accuracy desired to be achieved. A graphic representation 804 in FIG. 8 illustrates the concept of the decision window 802. As W is 4 in this case, the graphic representation 804 shows 4 slots arranged side by side horizontally and in series. Each slot represents a floor selection decision that is derived based on an OM requested from the mobile device (102 in FIG. 1). The 4 slots are sorted from the newest decision to the oldest decision. The left most slot 806 in the representation 804 represents the newest floor selection decision and the right most slot 808 is the oldest floor selection decision. The latest floor selection decision is queued into the left most slot 806 and the oldest floor selection decision would be queued out of the right most slot 808 when the latest floor selection decision is queued in. In the representation 804, from left to right, the newest floor decision 806 shows "floor 3" as its decision, followed by "floor 2" in the next slot, "floor 1" thereafter and lastly "floor 1" in the right most slot 808.

The Floor selection subroutine 800 begins with the presence of data representing the decision window 802 in the database server (106 in FIG. 1).

At step 810, the Floor Selection Algorithm described with reference to step 706 in FIG. 7 is run to derive a floor selection decision. Data of OMs (e.g. 502 in FIG. 5) obtained at the position of the mobile device (102 in FIG. 1) and subsequently acquired by the database server (106 in FIG. 1) are used in the Floor Selection Algorithm to derive the floor selection decision. Details of the Floor Selection Algorithm are described later with reference to FIG. 9.

After one floor selection decision is derived from the Floor Selection Algorithm at step 810, data of the derived floor selection decision would be manipulated at step 812 in a manner such that in the graphical representation 804 of the data manipulation, the derived floor selection decision is queued into the left most slot 806 as the latest floor selection decision. At the same time, data of the oldest floor selection decision in the right most slot 808 would be queued out. In the case described for FIG. 8, any queued out floor selection decision would not be considered again for determining the final floor selection decision.

Step 814 refers to the check on whether the Floor selection Algorithm needs to be run another time to derive a floor selection decision based on another OM (e.g. 502 in FIG. 5) requested from the mobile device (102 in FIG. 1).

More specifically, the check is performed to see if all floor selection decisions in the decision window 802, in this case, 4 of them, are equal. In other words, whether all 4 are indicating the same floor number of the subject multi-storey building. With reference to a second graphic representation 818 of the decision window 802 in FIG. 8, if all 4 decisions in the decision window 802 are indicating the same floor number e.g. floor 2, requirement for selecting that floor number as the final predicted floor is fulfilled and data of the final predicted floor would be outputted and stored at step 816.

In this case, if any one of the 4 decisions in the decision window 802 is not indicating the same floor number, another OM (502 in FIG. 5) would be requested from the mobile device (102 in FIG. 1) for deriving a new floor selection decision. When that happens, steps 810, 812 and 814 would be repeated again. Based on the requirement set for this case, as long as all 4 decisions are not equal, the Floor selection subroutine 800 will repeat steps 810, 812 and 814 again. A predetermined number of times could be set for the Floor selection subroutine 800 to repeat steps 810, 812 and 814 before, for instance, generating a message to indicate that the floor cannot be determined. It is appreciated that less stringent requirements may be implemented. For instance, requirement for selecting a floor number as the final predicted floor may be taken to be fulfilled if 3 out of the 4 floor decisions are the same.

Derivation of each floor selection decision by the Floor Selection Algorithm (900 in FIG. 9) would be described as follows with reference to FIG. 9.

At step 902, an OM (e.g. 502 in FIG. 5) is received by the database server (106 in FIG. 1) from the mobile device (102 in FIG. 1).

At step 904, an N number of MAC addresses with the largest FDM value in the FDMT 602 described with reference to FIG. 6 are selected from the OM (e.g. 502 in FIG. 5) received at step 902. What is considered as largest FDM value is predetermined. N is a value selected based on the prediction accuracy desired for determining the floor of the position of the mobile device (102 in FIG. 1). It could be in the range of, for instance, 2 to 10. With regard to the selection of the largest FDM value, if for example, the FDM value for a first $MAC_1$ equals to 5, the FDM value for a second $MAC_2$ equals to 3, and the FDM value for a third $MAC_3$ equals to 10, the third $MAC_3$ would be considered as having the largest FDM value.

At step 906, probability that one of the N number of MAC addresses observed on one floor of the subject multi-storey building is calculated based on the formula as follows.

$$Pr(MAC_i \text{ on a floor } k) = KDE\_FSA(MAC_i, RSS_i, RM_k)$$

where Pr(MAC$_i$ on a floor k) is the probability that the particular MAC address, MAC$_i$, is observed on floor k, MAC$_i$ is a MAC address in the N number of MAC addresses with the largest FDM value in the FDMT 602, RSS$_i$ is the corresponding received signal strength of the MAC address, MAC$_i$, in the N number of MAC addresses with the largest FDM value in the FDMT 602, i indicates which MAC; and corresponding RSS$_i$ in the N number of MAC addresses with the largest FDM value in the FDMT 602, and RM$_k$ is the Radio Map of the floor k in the subject multi-storey building.

KDE_FSA(MAC$_i$, RSS$_i$, RM$_k$) is a function for Pr(MAC$_i$ on a floor k) and it would be described in more detail with reference to FIG. 10. It is noted that KDE_FSA is just a mathematical function expression and it can be expanded to read as "Kernel Density Estimation (KDE)_Floor Selection Algorithm (FSA)". It is appreciated that any other mathematical function expression could also be used, e.g. f(MAC$_i$, RSS$_i$, RM$_k$).

Step 906 is repeated for each floor of the multi-storey building to form at step 908, a vector (or also called a matrix), VEC$_i$, containing a list of all probabilities that the particular MAC address, MAC$_i$, is observed on each floor of the subject multi-storey building. The Radio Map (RM) of the building 914 containing the individual RM of each floor is used accordingly at step 906. VEC$_i$ is associated to the particular MAC$_i$. Mathematically, the VEC$_i$ is represented as follows.

$$VEC_i = \begin{bmatrix} Pr(MAC_i \text{ on floor } 1) \\ Pr(MAC_i \text{ on floor } 2) \\ \vdots \\ Pr(MAC_i \text{ on floor } k) \end{bmatrix}$$

Steps 906 and 908 are repeated for each of the selected N number of MAC addresses.

After repeating steps 906 and 908, the VEC$_i$ of each of the N number of MAC addresses is formed.

At step 910, data of the probability of all the N number of MAC addresses being observed for each floor in the VEC$_i$ formed are summed together and stored in a matrix represented by a sum vector, SUM_VEC. Mathematically, SUM_VEC is represented by the formula as follows.

$$SUM\_VEC = \sum_i^N VEC_i = \begin{bmatrix} \sum_i^N Pr(MAC_i \text{ on floor } 1) \\ \sum_i^N Pr(MAC_i \text{ on floor } 2) \\ \vdots \\ \sum_i^N Pr(MAC_i \text{ on floor } k) \end{bmatrix}$$

where $$\sum_i^N Pr(MAC_i \text{ on floor } k)$$

is the sum probability that all the respective MAC addresses are observed on floor k of the subject multi-storey building.

At step 912, the floor number with the largest sum probability in the SUM_VEC is selected. The floor number selected would then be outputted as the floor selection decision of the Floor Selection Algorithm 900. For ease of description, this selected or predicted floor number is herein given the expression, k_sel.

For the Floor selection routine as described, the working principle is to use the probability of observing or detecting all MAC addresses of the access points on each floor as indicators for floor selection. It is appreciated that the floor with highest probability of observing or detecting the MAC addresses of the access points on that floor is most likely the floor on which the mobile device (102 in FIG. 1) is located. If the largest value of the largest sum probability is the same for two floors, one of the two floors would be randomly selected.

Calculation of KDE_FSA(MAC$_i$, RSS$_i$, RM$_k$) is described as follows with reference to a subroutine flowchart 1000 in FIG. 10.

Figure 9:
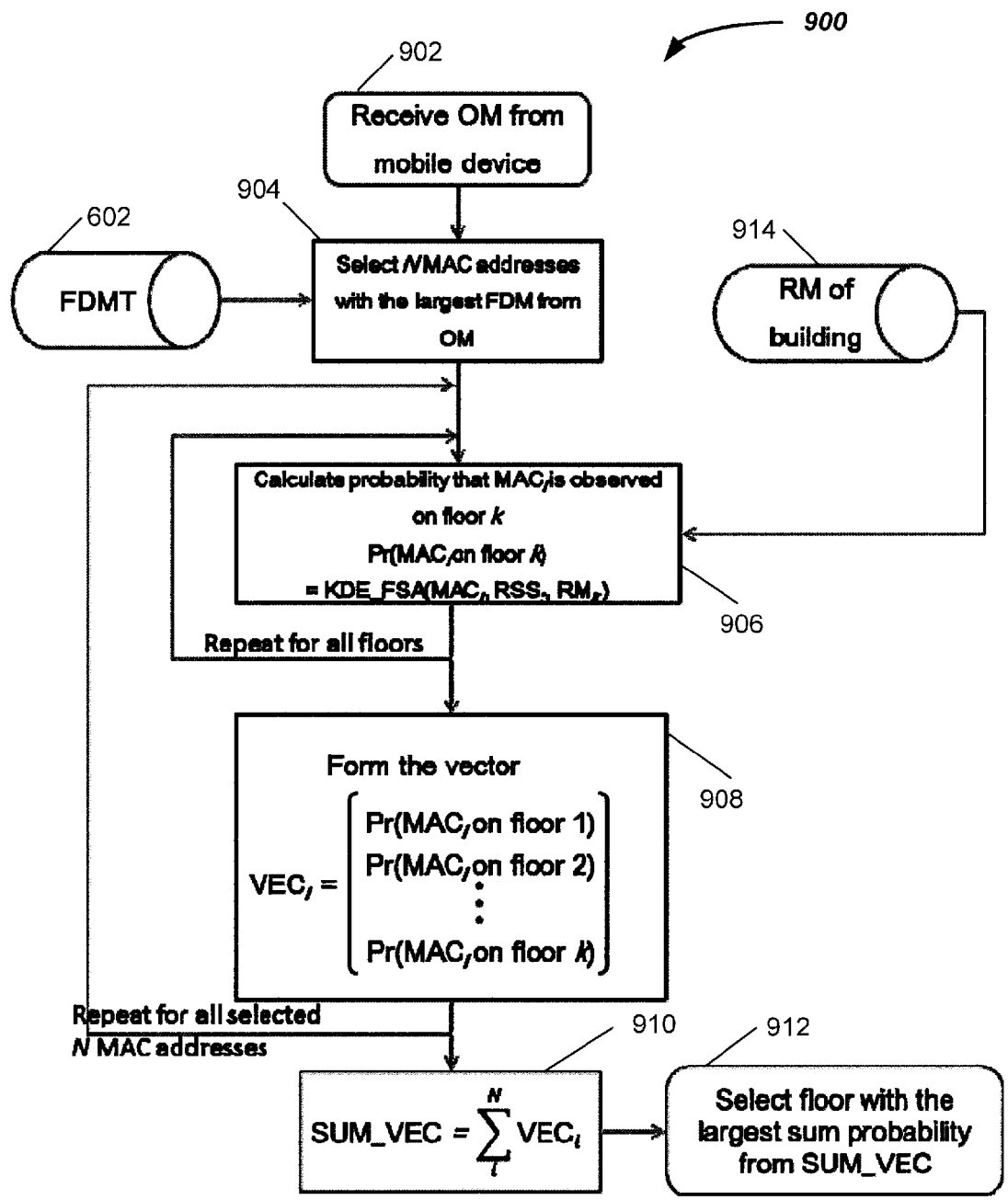
FIG. 9 shows a flowchart of a floor selection algorithm of the system.

At step 1002, MAC$_i$, RSS$_i$ and RM$_k$ for the Floor Selection Algorithm 900 in FIG. 9 are acquired. As described with reference to FIG. 9, MAC$_i$ is a MAC address in the selected N number of MAC addresses with the largest FDM value in the FDMT 602 described with reference to FIG. 6, RSS$_i$ is the corresponding received signal strength of the MAC address, MAC$_i$, and RM$_k$ is the Radio Map of a floor k in the subject multi-storey building.

At step 1004, Calibration Points (CP) containing MAC$_i$ in the RM$_k$ are selected. The number of CPs selected in this manner is indicated as N$_{KDE}$. N$_{KDE}$ is the number of CPs in the RM$_k$ that contains the specific MAC$_i$. N$_{KDE}$ is a variable that depends on, for instance, the distance between CPs and the environment where the mobile device (102 in FIG. 1) is located.

At step 1006, position probability of each selected CP, Pr(CP$_j$), is calculated. The position probability refers to the probability of the position of the selected CP containing MAC$_i$ in the RM$_k$ being the position of the mobile device (102 in FIG. 1) and it is derived based on the probability of a certain observed RSS value in the OM (e.g. 502 in FIG. 5) being measured from the location of the selected CP in the RM$_k$. In this case, an assumption is made that the RSS values would follow a Normal (or Gaussian) Probability Distribution Function, the probability that a certain observed RSS value is taken from the specific location of the CP is calculated by the formula as follows.

$$Pr(CP_j) = \frac{1}{C} \exp\left[\frac{\left(-\frac{1}{2}\right)(RSS_i - mRSS_{k,i}^j)^2}{B}\right]$$

where mRSS$^j_{k,i}$ is the mean Received Signal Strength of a selected CP$_j$ and it is calculated based on the formula described earlier with reference to step 408 of FIG. 4, RSS$_i$ is the corresponding Received Signal strength of the MAC$_i$ that is contained in the selected CP$_j$, depending on whether j is affixed as subscript or superscript to the expression CP or mRSS, j indicates which one of the CP in the RM$_k$ containing MAC$_i$ or the corresponding mRSS of that CP, depending on whether i is affixed as subscript or superscript to the expression RSS or mRSS, i indicates which one of the RSS or mRSS in the RM$_k$ that is associated with MAC$_i$, and C and B are predetermined parameters.

In this case, $C=\sqrt{(2\pi)}$ i.e. approximately 2.507 and $B=\sigma^2$ where $\sigma$ is the Gaussian Kernel bandwidth value predetermined based on the environment and distance between calibration points in the $RM_k$. $\sigma$ could be in the range of 2 to 20.

While the formula for $Pr(CP_j)$ is based on a Normal (or Gaussian) Probability Distribution Function (PDF), it is appreciated that other PDFs may also be used, such as a Laplace PDF, Uniform PDF, or any other suitable user-defined PDF.

Step 1006 is repeated for all the $N_{KDE}$ number of CPs to calculate the position probability for each of the CPs.

At step 1008, all the calculated position probability of each of the $N_{KDE}$ number of CPs are summed up. This sum, $KDE\_FSA(MAC_i, RSS_i, RM_k)$, can be represented mathematically as follows.

$$KDE\_FSA(MAC_i, RSS_i, RM_k)^N \sum_{j}^{KDE} Pr(CP_j)$$

It has been observed that the sum probability of all the position probability of each of the $N_{KDE}$ number of CPs i.e. $KDE\_FSA(MAC_i, RSS_i, RM_k)$ would be indicative of the probability that the particular MAC; in the selected N number of MAC addresses with the largest FDM value is observed on floor k i.e. $Pr(MAC_i$ on floor k). This sum probability takes into account all the calibration points in floor k that contains the specific $MAC_i$. Hence, at step 1010, $Pr(MAC_i$ on floor k) is provided with the value of $KDE\_FSA(MAC_i, RSS_i, RM_k)$. Mathematically, this is represented as follows.

$$Pr(MAC_i \text{ on floor } k)^N \sum_{j}^{KDE} Pr(CP_j)$$

Figure 11:
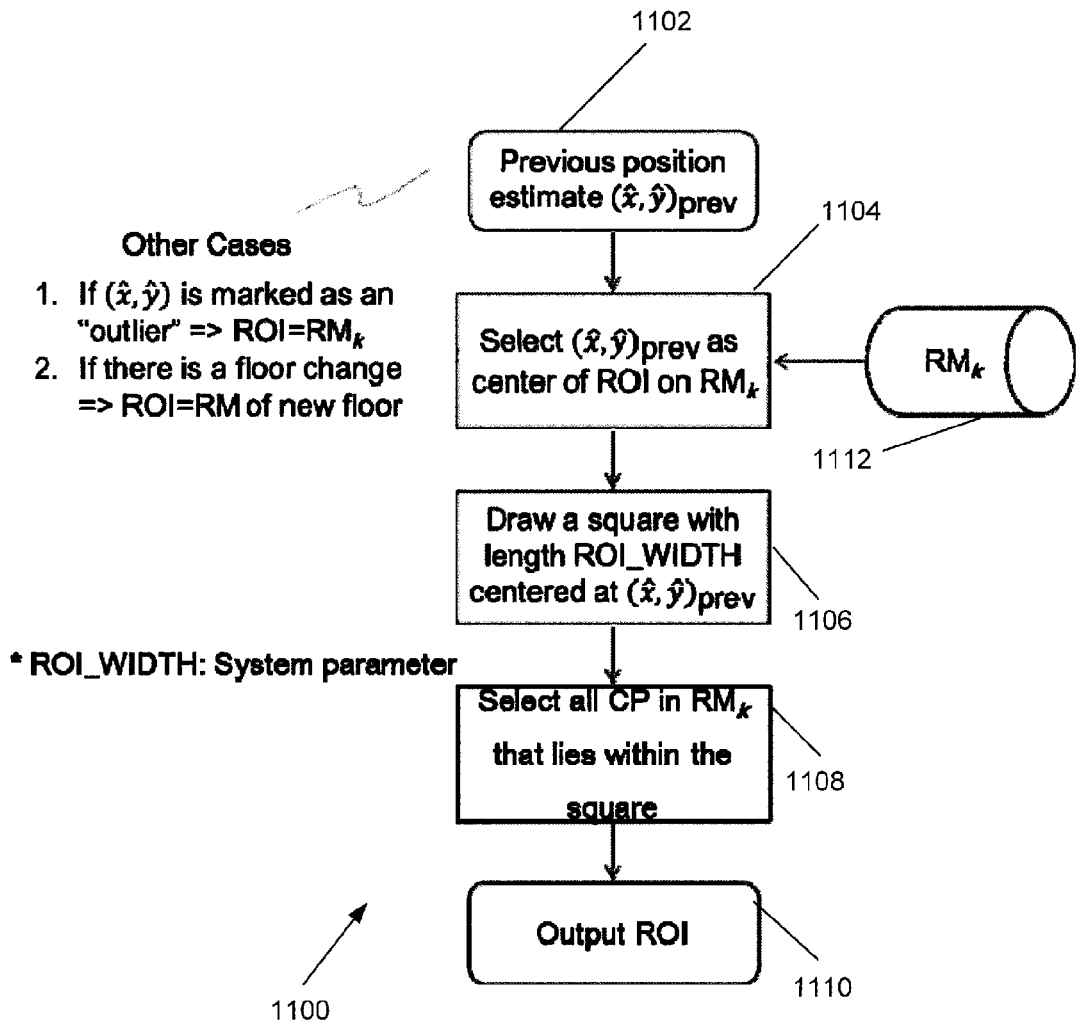
FIG. 11 shows a flowchart of a first part of a Region of Interest (ROI) subroutine of the system.

FIG. 11 shows a flowchart 1100 of a first part of the Region Of Interest (ROI) selection subroutine described with reference to step 708 of FIG. 7. The first part of the ROI selection subroutine is, if possible, used to determine a narrowed ROI in the Radio Map of the floor predicted 1112 in step 816 as described with reference to FIG. 8.

If there is a previous position estimate $(x', y')_{prev}$ derived from step 712 in FIG. 7, it would be used for determining a narrowed ROI in the Radio Map of the predicted floor k_sel, 1112. However, if there is no previous position estimate $(x', y')_{prev}$ or if the $(x', y')_{prev}$ is marked as an 'outlier', the ROI would not be narrowed and the entire Radio Map of the predicted floor k_sel 1112 would be selected as the ROI. An 'outlier' refers to a position estimate that is deemed to be unreliable for predicting the position of the mobile device (102 in FIG. 1). In more detail, the 'outlier' refers to a position estimate having a sum position probability that is equal to or lesser than a predetermined threshold, Th1, after it has gone through a reliability check at step 714 of FIG. 7 (more specifically, at step 1510 of FIG. 15 that is discussed later). The sum position probability is represented by the following mathematical expression and would be elaborated later with reference to FIG. 15.

$$\sum_{j \in Q} Pr(CP_j)$$

Furthermore, if there is a change in the latest predicted floor (outputted from step 912 of FIG. 9) on which the mobile device (102 in FIG. 1) is located when compared to the predicted floor of the previous position estimate, the Radio Map of the latest predicted floor would be selected as the ROI.

It is appreciated that for an ROI to be selected, it means that the data of all the Calibration Points in the ROI are selected.

The Region Of Interest (ROI) selection subroutine 1100 begins with step 1102. At step 1102, a previous position estimate, $(x', y')_{prev}$, if present, of the mobile device (102 in FIG. 1) that has previously been outputted from step 718 of FIG. 7 is retrieved.

At step 1104, the retrieved $(x', y')_{prev}$, assuming present, is selected as centre of the ROI in the Radio Map of the predicted floor k_sel, $RM_{k\_sel}$ 1112. The Radio Map of the predicted floor k_sel, $RM_{k\_sel}$ 1112, is required for processing at this step.

Conceptually, a square with a predetermined length, ROI_WIDTH, centred at $(x', y')_{prev}$ is drawn on the Radio Map of the predicted floor k_sel, $RM_{k\_sel}$ 1112, at step 1106. This square essentially marks out a narrowed ROI. ROI_WIDTH is a value selected based on environmental factors and the prediction accuracy desired for the position of the mobile device (102 in FIG. 1). The length, ROI_WIDTH, expressed in terms of the number of Calibration Points covered may be, for instance, 2 to 10 Calibration Points long. It is appreciated that a circle, rectangle or other shapes other than square could also be used.

At step 1108, all Calibration Points (CPs) in the Radio Map of the predicted floor k_sel, $RM_{k\_sel}$ 1112, and in the square are selected.

Data of the CPs selected at step 1108 is outputted at step 1110 as the selected ROI.

Figure 12:
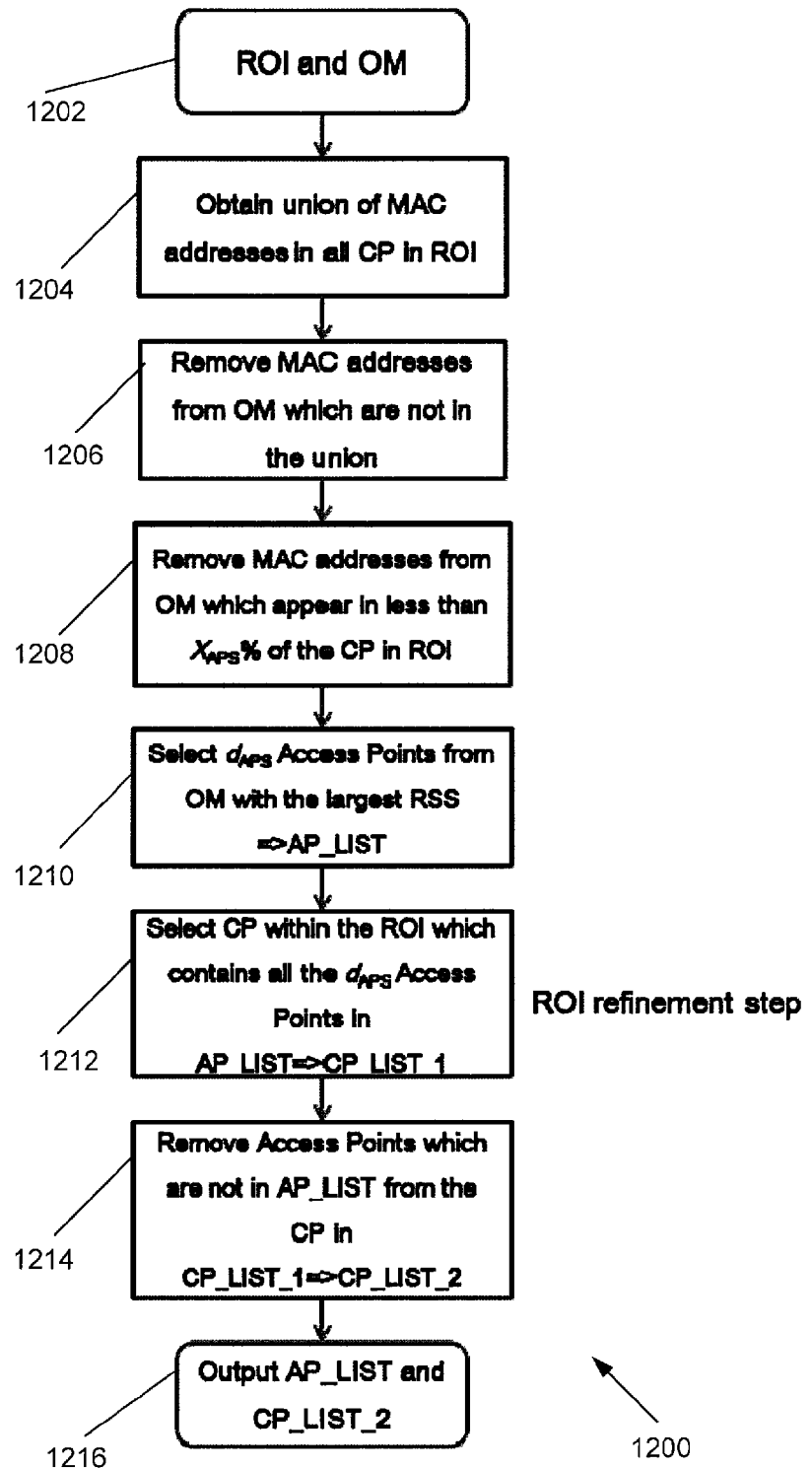
FIG. 12 shows a flowchart of a second part of a Region of Interest (ROI) subroutine of the system.

FIG. 12 shows a flowchart 1200 of a second part of the Region Of Interest (ROI) selection subroutine described with reference to step 708 of FIG. 7. The flowchart 1200 is a continuation from the flowchart 1100 in FIG. 11.

At step 1202, the selected ROI from the first part of the ROI selection subroutine represented by flowchart 1100 in FIG. 11 and the OM (e.g. 502 in FIG. 5) received at step 702 in FIG. 7 are gathered for processing.

At step 1204, a union (in the context of the Probability Theory) of all MAC addresses in all the Calibration Points of the selected ROI is obtained. The union is basically a list of all MAC addresses that can be found in each of the Calibration Points of the selected ROI. The same MAC address found in two or more Calibration Points would not be duplicated in the list.

At step 1206, all the MAC addresses in the OM (e.g. 502 in FIG. 5) that are not found in the union are removed from the OM (e.g. 502 in FIG. 5). This step essentially removes all the MAC addresses of access points in the OM that is not likely to help in the prediction of the position of the mobile device (102 in FIG. 1). The MAC addresses found in the CPs of the selected ROI are more trusted as they are detected in the creation of the Radio Map for the subject building that is described with reference to FIG. 4. The creation of the Radio Map for the subject building can be regulated by a service provider for quality and be updated periodically to ensure that the data is trustworthy. On the other hand, data of the OM is gathered by the mobile device (102 in FIG. 1) that belongs to a random user, the source of the data is thus less trustworthy.

At step 1208, MAC addresses from the OM appearing in less than $X_{APS}\%$ of the Calibration Points in the selected ROI are removed. This further filters the access points detected by the OM to only those that would most likely be of good help in the prediction of the position of the mobile device (102 in FIG. 1). $X_{APS}\%$ is a value selected based on the prediction accuracy desired for the position of the mobile device (102 in FIG. 1). It could be in the range of, for instance, 25-75%.

At step 1210, $d_{APS}$ number of access points, more specifically their MAC addresses, having the largest RSS values are selected from the OM. This step filters out the number of access points detected by the OM to only those with strong RSS that would be of good help in the prediction of the position of the mobile device (102 in FIG. 1) compared to the access points with weaker RSS. Data of the MAC addresses of the $d_{APS}$ number of access points and their corresponding RSS values are stored and herein denoted by a variable, AP_LIST. $d_{APS}$ is a value selected based on the prediction accuracy desired for the position of the mobile device (102 in FIG. 1). Its selection depends on the number of Calibration Points in the selected ROI and the acceptable computation time allocated for processing involving the $d_{APS}$ number of access points. If the $d_{APS}$ number is too high, many computations are required and the position estimation time may become unacceptable. The $d_{APS}$ number may be, for instance, 2 to 10.

Steps 1212 and 1214 are for ROI refinement. The aim is to refine or narrow the selected ROI further for better prediction of the position of the mobile device (102 in FIG. 1).

Only all CPs within the selected ROI, which contains the $d_{APS}$ number of access points in the AP_LIST are selected at step 1212. Data of the CPs selected are stored and herein denoted by a variable CP_LIST_1.

At step 1214, MAC addresses of access points which are not in the AP_LIST are removed from the data of the CPs in CP_LIST_1 to arrive at a new list of CPs herein denoted by a variable CP_LIST_2. Hence, CP_LIST_2 contains CPs in the selected ROI with only MAC addresses of access points with strong RSS that are detected by the mobile device (102 in FIG. 1) at the position to be predicted.

At step 1216, the AP_LIST and the CP_LIST_2 are outputted for further processing.

Figure 13:
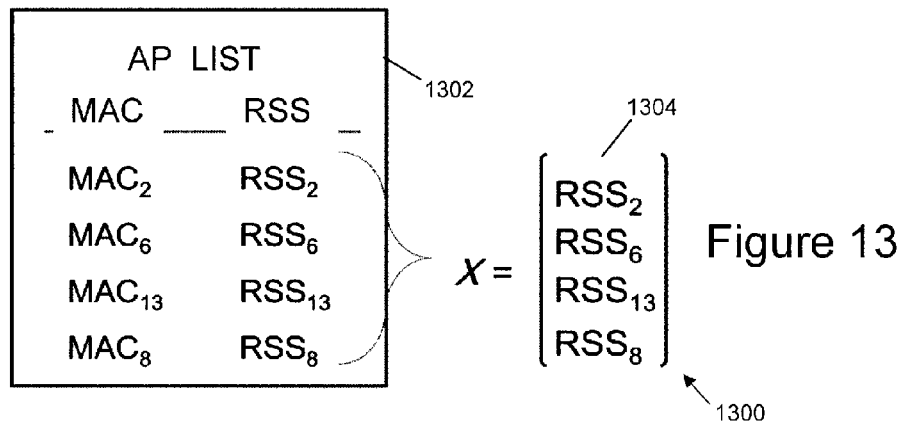
FIG. 13 shows a table containing data relating to a selected list of wireless access points.

FIG. 13 illustrates data contained in an AP_LIST 1300 generated in the manner described with reference to FIG. 12. In FIG. 13, the data is represented by a table 1302 containing MAC addresses $MAC_2$, $MAC_6$, $MAC_{13}$ and $MAC_8$ and the corresponding Received Signal Strengths $RSS_2$, $RSS_8$, $RSS_{13}$ and $RSS_8$. It is appreciated that the contents of the table 1302 are showing random samples of MAC addresses and their corresponding RSS values in the AP_LIST. The MAC addresses and the corresponding RSS values would vary depending on what is outputted as the AP_LIST at step 1216 of FIG. 12. The RSS values of the MAC addresses in the AP_LIST are denoted by a vector X 1304, which can be represented mathematically as follows.

$$X = \begin{bmatrix} RSS_2 \\ RSS_6 \\ RSS_{13} \\ RSS_8 \end{bmatrix}$$

Figure 14:
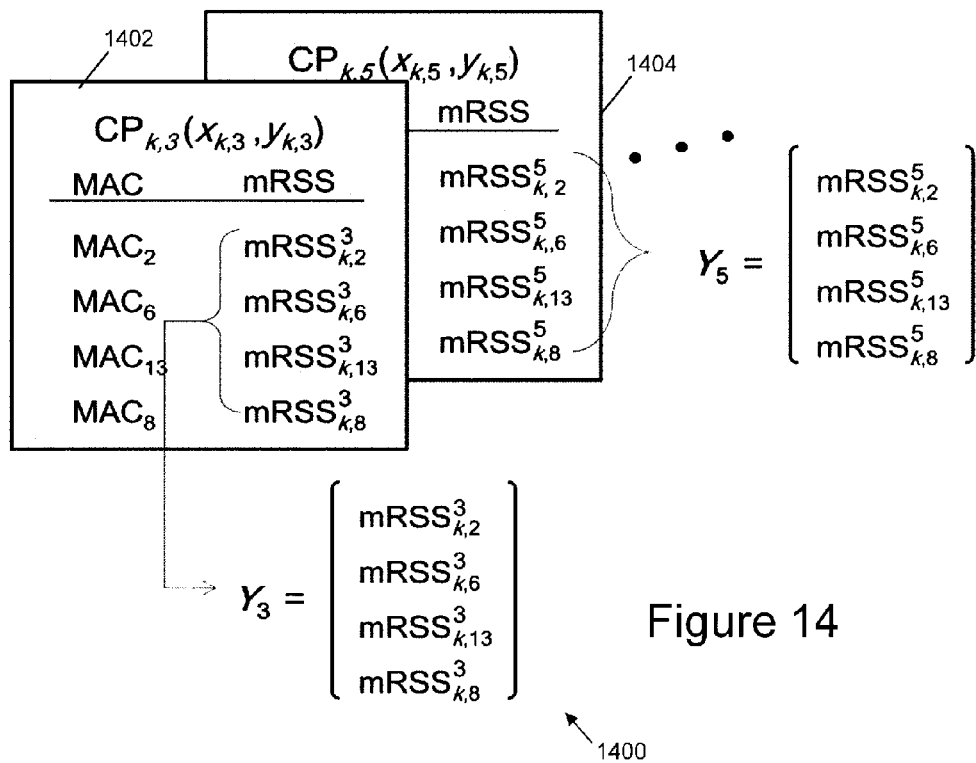
FIG. 14 shows tables containing data of Calibration Points of the system.

FIG. 14 illustrates data contained in the Calibration Points of a CP_LIST_2 1400 that is outputted at step 1216 of FIG. 12. The data of two example Calibration Points, $CP_{k\_sel,3}(x_{k\_sel,3}, y_{k\_sel,3})$ and $CP_{k\_sel,5}(x_{k\_sel,5}, y_{k\_sel,5})$, are specifically illustrated in FIG. 14. $CP_{k\_sel,3}(x_{k\_sel,3}, y_{k\_sel,3})$ is represented by a first table 1402 and $CP_{k\_sel,5}(x_{k\_sel,5}, y_{k\_sel,5})$ is represented by a second table 1404.

With reference to the random samples in the AP_LIST 1300 of FIG. 13, the first table 1402 contains MAC addresses $MAC_2$, $MAC_6$, $MAC_{13}$ and $MAC_8$ and the respective mean Received Signal Strengths $mRSS^3_{k\_sel,2}$, $mRSS^3_{k\_sel,6}$, $mRSS^3_{k\_sel,13}$ and $mRSS^3_{k\_sel,8}$. The second table 1404 contains MAC addresses $MAC_2$, $MAC_6$, $MAC_{13}$ and $MAC_8$ and the respective mean Received Signal Strengths $mRSS^5_{k\_sel,2}$, $mRSS^5_{k\_sel,6}$, $mRSS^5_{k\_sel,13}$ and $mRSS^5_{k\_sel,8}$. It is noted that these mRSS values corresponding to the respective MAC addresses originate from the Radio Map of the predicted floor k_sel (1112 in FIG. 11). The mRSS values in $CP_{k\_sel,3}(x_{k\_sel,3}, y_{k\_sel,3})$ and $CP_{k\_sel,5}(x_{k\_sel,5}, y_{k\_sel,5})$ are denoted by vector $Y_3$ 1406 and $Y_5$ 1408 respectively, which can be represented mathematically as follows.

$$Y_3 = \begin{bmatrix} mRSS^3_{k_{sel},2} \\ mRSS^3_{k_{sel},6} \\ mRSS^3_{k_{sel},13} \\ mRSS^3_{k_{sel},8} \end{bmatrix} \quad Y_5 = \begin{bmatrix} mRSS^5_{k_{sel},2} \\ mRSS^5_{k_{sel},6} \\ mRSS^5_{k_{sel},13} \\ mRSS^5_{k_{sel},8} \end{bmatrix}$$

In the expressions given for the two Calibration Points and the corresponding mRSS values, k_sel is indicative of the predicted floor (outputted from step 912 of FIG. 9) of the subject building in which the mobile device (102 in FIG. 1) is located, the numbers 3 and 5 denote the respective Calibration Point as listed in the CP_LIST_2 1400, and the numbers 2, 6, 13 and 8 respectively denote that the mRSS values correspond to MAC addresses $MAC_2$, $MAC_6$, $MAC_{13}$ and $MAC_8$ respectively.

Figure 15:
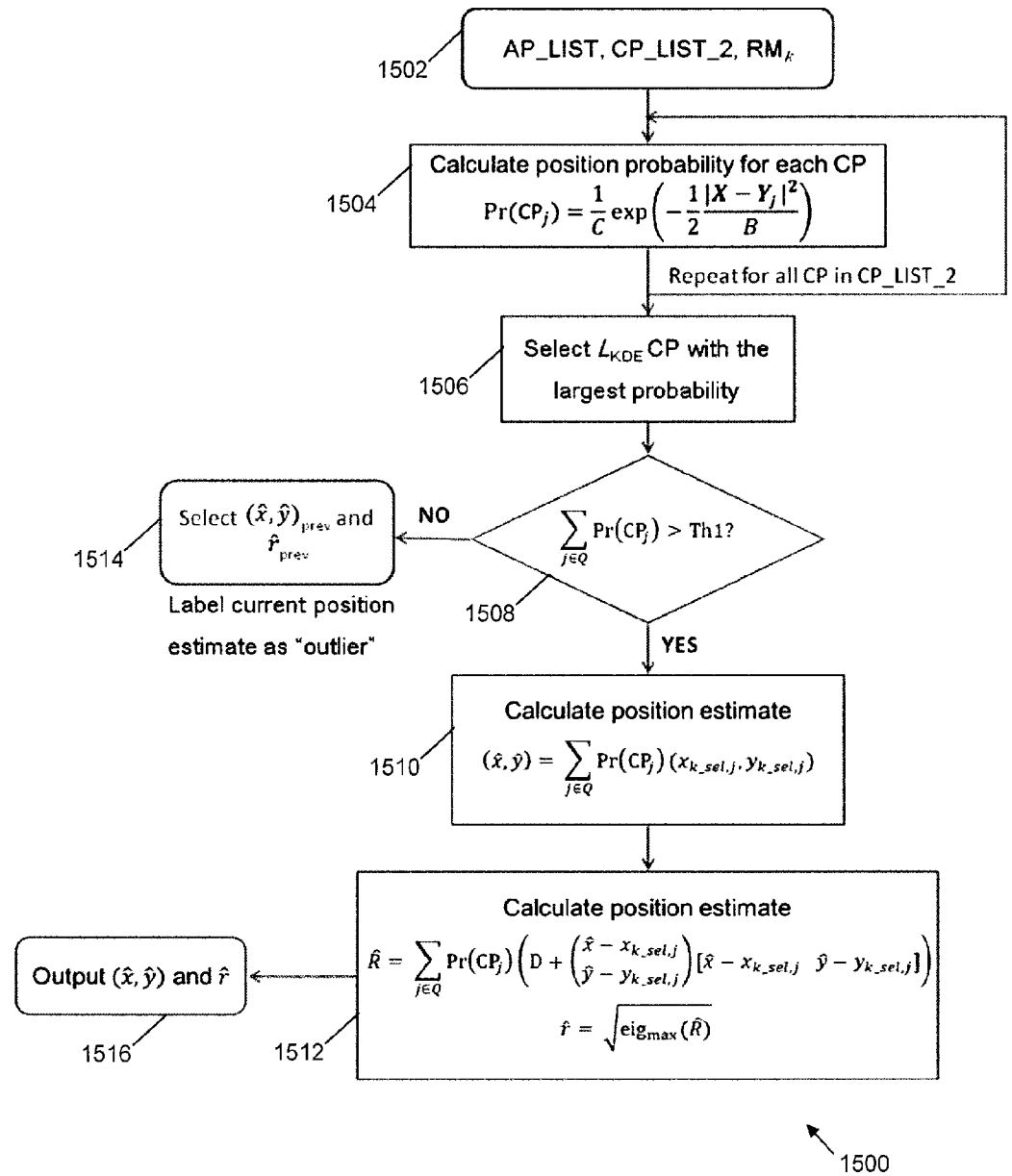
FIG. 15 shows a flowchart of a position estimate subroutine of the system.

FIG. 15 shows a flowchart 1500 of a position estimate subroutine described with reference to step 714 of FIG. 7. The position estimate subroutine basically conducts Kernel Density Estimation (KDE) for deriving a position estimate, $(\hat{x}, \hat{y})$, of the mobile device (102 in FIG. 1) and a reliability value, $\gamma$, that is indicative of the reliability of the position estimate.

The position estimate subroutine begins with step 1502, which retrieves the AP_LIST (e.g. 1300 in FIG. 13) generated in the manner described with reference to FIG. 12, the CP_LIST_2 (e.g. 1400 in FIG. 14) that is outputted at step 1216 of FIG. 12, and the Radio Map of the predicted floor k_sel (outputted at step 912 of FIG. 9), $RM_{k\_sel}$, for processing.

At step 1504, position probability of each CP in the CP_LIST_2 (e.g. 1400 in FIG. 14) is calculated by the formula as follows.

$$Pr(CP_j) = \frac{1}{C}\exp\left[\frac{\left(-\frac{1}{2}\right)(X - Y_j)^2}{B}\right]$$

where $CP_j$ indicates which CP in the CP_LIST_2 (e.g. 1400 in FIG. 14), $Y_j$ is a vector containing a list of mean Received Signal Strengths in a $CP_j$ of the CP_LIST_2 (e.g. 1400 in FIG. 14), for example, $Y_3$ 1408 and $Y_5$ 1406 in FIG. 14, X is a vector containing a list of corresponding Received Signal strength of all MAC addresses in the AP_LIST (e.g. 1300 in FIG. 13), for example, X 1304 in FIG. 13, depending on whether j is affixed as subscript or superscript to the expression CP or Y, j indicates a CP in the CP_LIST_2 (e.g. 1400 in FIG. 14) or the Y vector of that CP in the CP_LIST_2, and C and B are predetermined parameters based on Gaussian Probability Densuty Functions. Here, the mathematical formulas of C and B are as follows.

$$C = 2\pi^{\left(\frac{d_{APS}}{2}\right)}[\det(\text{cov})]^{\left(\frac{1}{2}\right)}$$

where 'cov' is a 2×2 diagonal matrix whose diagonal element is the Gaussian Kernel bandwidth of Received Signal Strength and 'det' denotes the determinant of a square matrix.

The formula for $Pr(CP_j)$ is based on a Normal (or Gaussian) Probability Distribution Function (PDF). It is appreciated that other PDFs may also be used, such as a Laplace PDF, Uniform PDF, or any other suitable user-defined PDF.

The calculation at step 1504 repeats until position probability of all CPs in the CP_LIST_2 is derived.

At step 1506, $L_{KDE}$ number of the CPs having the largest probability is selected. This selection is to pick out the CPs in the CP_LIST_2 that can best represent the position of the mobile device (102 in FIG. 1). $L_{KDE}$ is a predetermined number selected based on the distance between calibration points and the prediction accuracy desired for determining the position estimate of the mobile device (102 in FIG. 1). It could be in the range of, for instance, 2 to 10.

At step 1508, a sum, SUM_LKDE, of all the selected largest position probability result of each of the $L_{KDE}$ number of CPs at step 1506 is compared with a threshold value, Th1.

Th1 describes the minimum acceptable sum probability of the position estimate of the mobile device (102 in FIG. 1) within a specific Region Of Interest (ROI). It is determined based on the following factors:
i) environmental;
ii) distance between CPs;
iii) number of AP used for position estimation, i.e. $d_{APS}$;
iv) number of CP used for position estimation, i.e. $L_{KDE}$;
v) prediction accuracy desired for position estimation.

Th1 could be in the range of $10^4 \sim 10^{-8}$.

SUM_LKDE is represented mathematically as follows.

$$\text{SUM\_LKDE} = \sum_{j \in Q} Pr(CP_j)$$

where Q denotes the indices of the selected $L_{KDE}$ number of CPs at step 1506. For example, the index of a selected $CP_1$ is 1.

SUM_LKDE represents how well the position of the mobile device (102 in FIG. 1) can be represented by the selected $L_{KDE}$ number of CPs.

If SUM_LKDE is larger than Th1, position estimate of the mobile device (102 in FIG. 1) would be calculated at step 1510.

If SUM_LKDE is equal to or less than Th1, the previously derived position vector $(\hat{x},\hat{y})_{prev}$ and previously derived position reliability value $\hat{\gamma}_{prev}$ from the position estimate subroutine are selected at step 1514. In this case, the calculated position estimate $(\hat{x},\hat{y})$ at step 1510 would be indicated as the 'outlier' described earlier with reference to FIG. 11.

At step 1510, a position estimate $(\hat{x},\hat{y})$ of the position of the mobile device (102 in FIG. 1) is calculated by the following formula.

$$(\hat{x}, \hat{y}) = \sum_{j \in Q} Pr(CP_j)(x_{k,j}, y_{k,j})$$

hence.

$$\hat{x} = \sum_{j \in Q} Pr(CP_j)(x_{k\_sel,j})$$

$$\hat{y} = \sum_{j \in Q} Pr(CP_j)(y_{k\_sel,j})$$

where $(x_{k\_sel,j}, y_{k\_sel,j})$ indicates the coordinates of each of the $L_{KDE}$ number of CPs, and $Pr(CP_j)$ is the position probability result in $CP_j$.

The formula basically calculates the weighted average values of the x and y coordinates of each of the $L_{KDE}$ number of CPs to arrive at the position estimate $(\hat{x},\hat{y})$. To aid understanding, for example, if $Pr(CP_1)=0.2$, $x_{k\_sel,1}=10$, $y_{k\_sel,1}=20$ and $Pr(CP_2)=0.5$, $x_{k\_sel,2}=30$, $y_{k\_sel,2}=40$, then the position estimate based on $CP_1$ and $CP_2$ is given by $\hat{x}=0.2\times10+0.5\times30=17$ and $\hat{y}=0.2\times20+0.5\times40=24$.

At step 1512, the reliability value $\hat{\gamma}$ is derived as follows.

$$\hat{R} = \sum_{j \in Q} Pr(CP_j)\left(D + \begin{pmatrix} \hat{x}-x_{k,j} \\ \hat{y}-y_{k,j} \end{pmatrix}[\hat{x}-x_{k,j}\ \hat{y}-y_{k,j}]\right)$$

$$\hat{r} = \sqrt{\text{eig}_{max}(\hat{R})}$$

where $\hat{R}$ is a 2×2 matrix that represents the weighted summation of all co-variance matrices of the position estimate,
D is a 2×2 diagonal matrix whose diagonal element is the Gaussian Kernel bandwidth of the Cartesian "x-y" coordinates, and
$\text{eig}_{max}(\hat{R})$ refers to the maximum value contained the matrix, $\hat{R}$.

Matrix $\hat{R}$ describes the similarity of the position estimate $(\hat{x},\hat{y})$ to the locations of CPs that are used to calculate this position estimate. In other words, $\hat{R}$ describes how confident the position estimate $(\hat{x},\hat{y})$ is as an estimate to the position of the mobile device (102 in FIG. 1). The square root of the maximum eigenvalue of $\hat{R}$, $\hat{r}$, is a mathematical representation of this confidence.

At step 1516, the calculated position estimate $(\hat{x}, \hat{y})$ at step 1510 and the calculated $\hat{r}$ at step 1512 would be outputted respectively as the predicted position of the mobile device (102 in FIG. 1) and the corresponding reliability value provided that the calculated position estimate $(\hat{x}, \hat{y})$ is not indicated as an 'outlier'. Otherwise, the selected previously derived position vector $(\hat{x}, \hat{y})_{prev}$ and previously derived position reliability value $\hat{r}_{prev}$ would be outputted.

For more accurate floor selection, extra steps may be taken. For example, with reference to FIG. 7, when the main application first starts up, the floor selection subroutine (800 in FIG. 8) executed at step 706 can be made to be performed for a predetermined number of times to determine the floor where the mobile device (102 in FIG. 1) is on. Once the floor where the mobile device (102 in FIG. 1) is on is determined, the decision making step 704 in FIG. 7 will be made to initiate the floor selection subroutine (800 in FIG. 8) if and only if:
i) an outlier is detected; and
ii) when the position estimate falls into floor switching regions.

The floor switching regions are predefined and are close to elevators, escalators, and stairs where changing floors is possible. These regions can be represented as squares, circles, and any other shape. The sizes of these regions are determined by the environment and the typical motion speed of people in the specific building. It could be in the range of 10 m$^2$~100 m$^2$.

Updating of position estimate i.e. invoking of steps 708 to 718 in FIG. 7 can be made to be manually activated by the user or periodically updated by the mobile device (102 in FIG. 1) automatically at time intervals set based on the application of the technology concerned. For instance, for a shopper in a multi-storey mall, the time interval could be 15 seconds.

With regard to retrieving data of Observation Matrices (OMs) from the mobile device (102 in FIG. 1) by the database server (106 in FIG. 1), which is described earlier, it is appreciated that the database server (106 in FIG. 1) could instead receive data contained in the OMs from each one of the access points observable or detectable by the mobile device (102 in FIG. 1) directly. The data from the one or more access points observable or detectable by the mobile device (102 in FIG. 1) could be sent to the database server (106 in FIG. 1) after they receive a probing signal from the mobile device (102 in FIG. 1). In more detail, each access point sends data of its MAC address and the corresponding RSS value that it could have sent to the mobile device (102 in FIG. 1) in the previous example directly to the database server (106 in FIG. 1). With all the data collected from each access points, the database server (106 in FIG. 1) creates OMs with them. The OMs created by the database server (106 in FIG. 1) would then be used for further processing in the various subroutines described with reference to FIG. 7 to predict the floor and position estimate of the mobile device (102 in FIG. 1). Advantageously, in this case, the mobile device (102 in FIG. 1) is not responsible for creating any OMs and as a result it would less likely run into problems with, for instance, security or technical features preventing the mobile device from communicating with the database server (106 in FIG. 1) directly.

Figure 16:
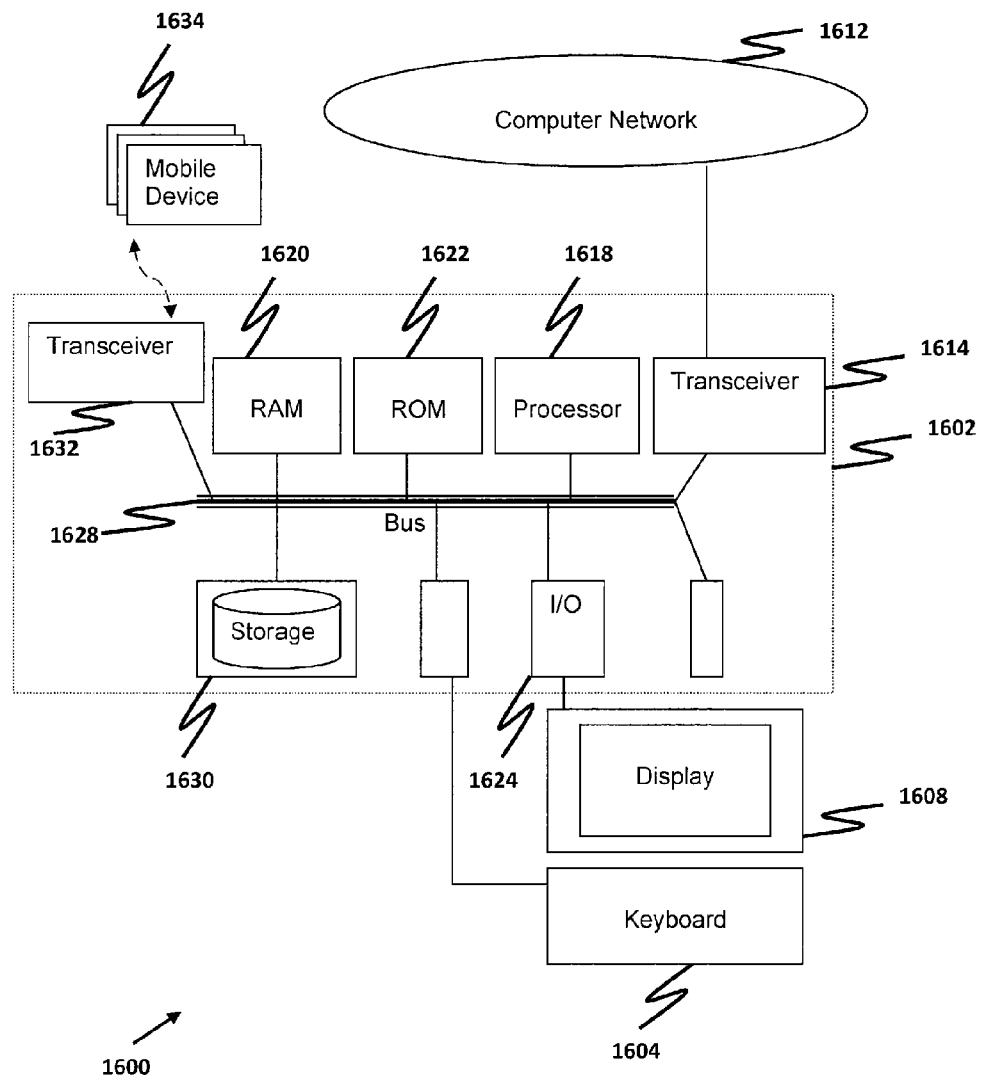
FIG. 16 shows a schematic diagram of a database server of the system.

The database server 106 in FIG. 1 may be a computer 1600, schematically shown in FIG. 16. There may be provided software, such as one or more computer programs being executed within the computer 1600, and instructing the computer 1600 to store data, communicate and retrieve data from the mobile device 102 in FIG. 1, including, for instance, the code instructions for generating a Radio Map of a subject building, the floor selection subroutine, ROI selection subroutine, position estimate subroutine described in at least FIG. 7.

The computer 1600 comprises a processing unit 1602 for processing the one or more computer programs, and includes input modules such as a keyboard/keypad 1604, and/or a plurality of output devices such as a display 1608 to facilitate interaction with the computer system 1600.

The processing unit 1602 may be connected to a data storage device (including database or memory) 1630 for storing, for instance, data of the Radio Map of the subject building, Observation Matrices from the mobile device 102 in FIG. 1, and all inputs, threshold values for comparison, and outputs of the various subroutines described in at least FIG. 7.

The processing unit 1602 may be connected to a computer network 1612 via a suitable transceiver device 1614 (i.e. a network interface), to enable access to e.g. the Internet or other network systems such as a wired Local Area Network (LAN) or Wide Area Network (WAN). The processing unit 1602 may also be connected to one or more external wireless communication enabled devices 1634 (e.g. the mobile device 102 in FIG. 1) via a suitable wireless transceiver device 1632 including a WiFi transceiver, a Mobile telecommunication transceiver suitable for Global System for Mobile Communication (GSM), 3G, 3.5G, 4G telecommunication systems, and the like.

The processing unit 1602 in the example includes a processor 1618, Memories such as a Random Access Memory (RAM) 1620 and a Read Only Memory (ROM) 1622. The processing unit 1602 also includes a number of Input/Output (I/O) interfaces, for example I/O interface 1624 to the display 1608, and I/O interface 1626 to the keyboard 1604.

The components of the processing unit 1602 typically communicate via an interconnected bus 1628 and in a manner known to the person skilled in the relevant art.

The computer programs may further include one or more software applications for e.g. internet accessibility, operating the computer system 1600 (i.e. operating system), network security, file accessibility, database management, which are applications typically equipped on a desktop or portable computer. The computer programs may be supplied to the user of the computer system 1600 encoded on a data storage medium such as a CD, DVD, on a flash memory carrier or a Hard Disk Drive. Such application programs may also be downloaded from the computer network 1612. The application programs are read and controlled in its execution by the processor 1618. Intermediate storage of program data may be accomplished using RAM 1620.

Furthermore, one or more of the steps of the computer programs may be performed in parallel rather than sequentially. One or more of the computer programs may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the Wireless LAN (WLAN) system. The computer program when loaded and executed on such a general-purpose computer effectively results in an apparatus that implements the steps of the computing processes and methods in examples herein described.

Figure 17:
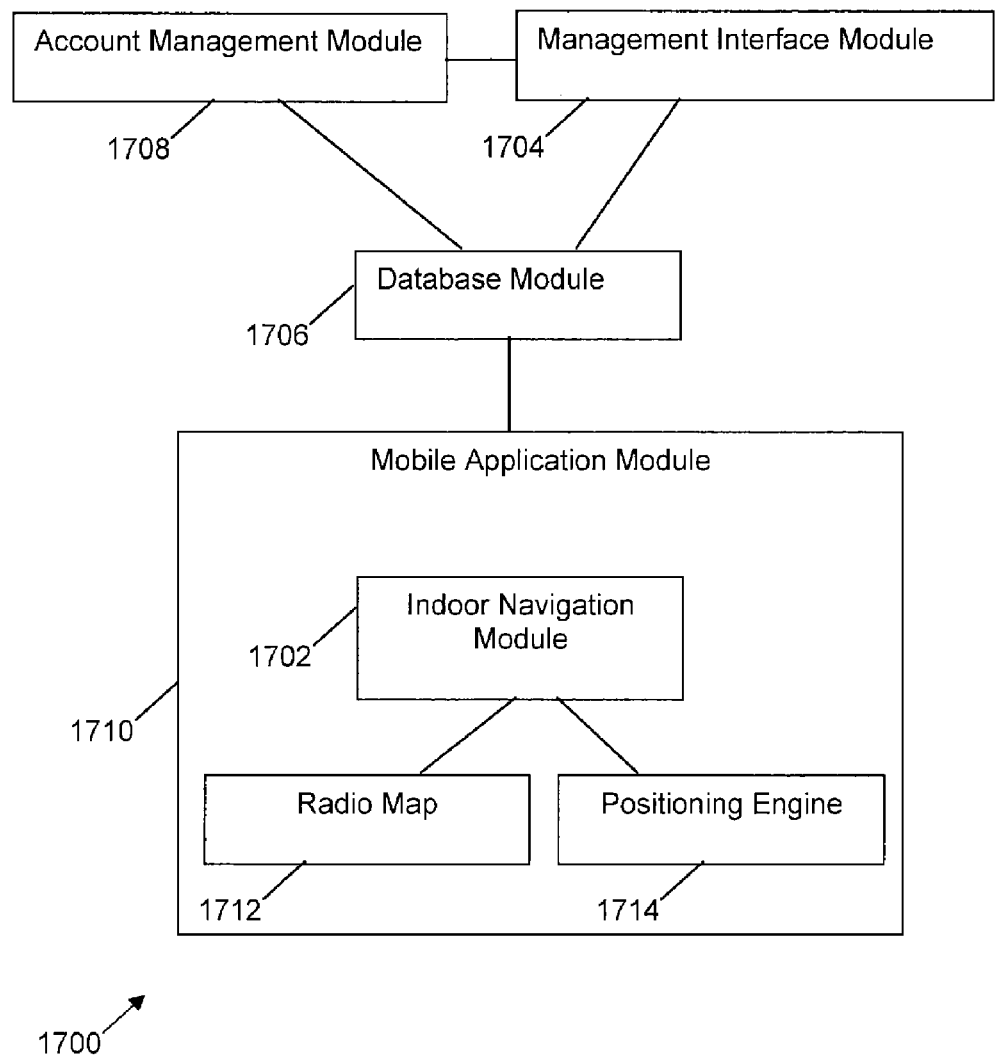
FIG. 17 shows a schematic diagram of components of the system.

With reference to FIG. 17, the generic components of the system 100 in FIG. 1 (expressed as 1700 in FIG. 17) may be classified into 5 modules, namely Indoor Navigation Module 1702, Management Interface Module 1704, Database Module 1706, Account Management Module 1708 and Mobile Application Module 1710.

The 5 modules are generic in nature and can be accommodated to different applications through software programming.

The Indoor Navigation Module 1702 resides in the Mobile Application Module 1710 which is downloaded into users' mobile devices in the form of a mobile application. The Mobile Application Module 1710 provides the graphical interface on the mobile device through which the user utilizes the indoor navigation service or reports his/her current position for tracking purposes. More specific examples of the users' mobile devices would be smartphones with the following operating systems, iOS, Android and Symbian operating systems. These commercial off-the-shelf smartphones are not only widely available and user friendly, their multimedia capabilities also mean that useful features can be incorporated into the indoor positioning platform, such as pushing relevant information to the mobile device at specified locations or pushing location-specific awareness promoting advertisements to the mobile devices of users.

By implementing the indoor positioning technology in a mobile application which may be freely downloaded to common mobile devices, which many people would own one, the technology would be advantageously incorporated into the daily lives of the people. Such is analogous to how Global Positioning System (GPS) became a staple function in modern mobile phones. Instead of a customised and specialized tag that is used in most current solutions for tracking people and objects, with the system 1700, people and objects could be tracked by making use of existing WiFi networks found indoors in many modern buildings.

Every user will be able to create a personal online account which is handled by the Account Management module 1708. Through the online account, a system administrator and a user are able to configure personal profiles and preferences. Once logged in, the location of the user can be updated in real-time to the Database Module 1706. Depending on the configuration at the Management Interface Module 1704, real-time locations stored in the Database Module 1706 can be pushed to or pulled by other users.

The Management Interface Module 1704 is the central controller of all information. It will be able to retrieve real-time location updates from the Database Module 1706 and visually map the instantaneous locations of all users. Through this module, the system administrator is able to decide on other data or information that is to be pushed or pulled from specific users at a particular time and location.

The Indoor Navigation Module 1702 consists of a radio map 1712 of a subject multi-storey building, a positioning engine 1714 and a navigation engine. In providing navigational capabilities, the most important and also the most challenging task is to determine the current position of the user. There are a number of techniques for outdoor positioning using radio frequency (RF) waveforms, such as time-of-arrival (TOA), time-difference-of-arrival (TDOA), and path loss determination. TOA and TDOA are often used in proprietary wireless positioning systems with dedicated hardware, such as the GPS, to provide highly accurate positioning. However, they are not suitable for indoor environment due to user inconvenience [e.g. it is inconvenient to carry a Radio Frequency Identification (RFID) tag], system complexity (e.g. requirement of sophisticated wireless system equipment), cost and inaccuracy (e.g. GPS can be relatively inaccurate frequently).

In system 1700, existing WiFi networks are tapped on for positioning without additional dedicated hardware of the proprietary wireless positioning systems and a path loss determination method is used.

The path loss determination method is based on a fundamental physical phenomenon where attenuation of RF power increases with distance according to a certain path loss model. In other words, if the transmit power is known and the RF power is measured at the receiver, the difference between the received and transmit power will provide end-to-end channel attenuation. Presuming that the path loss model is known, with the measured channel attenuation, the distance between transmitter and receiver can be calculated. Now, if a user is able to receive RF signals from a number of WiFi access points and measure each of the channel attenuations, the user will be able to determine his/her current position through triangulation.

In reality however, the path loss model cannot be accurately estimated as it depends heavily on variables such as the structure of the building, placement of furniture and human traffic conditions. To overcome this problem, in system 1700, an "RE fingerprinting" (this refers to the construction of a Radio Map for the subject building described earlier) of the whole environment (i.e. each floor of the subject building) is performed. Firstly, the environment is divided into grids containing numerous anchor points (or calibration points), where the distance between each neighbouring anchor point is, for instance, 2 m. A calibration receiver is then successively placed at each anchor point where it will measure the received signal strength (RSS) from surrounding WiFi access points, tag a vector consisting of data of the RSS to the particular anchor point and the MAC addresses of the access points, and save the information in a database. After going through all the anchor points, this database will form the radio map of the environment. Thus, the radio map gives one-to-one mapping between the received signal strengths from certain access points (identified by their MAC addresses) by the mobile device and the position within the environment.

The radio map is then utilized by the positioning engine 1714 to determine the building floor and the position on the floor of any arbitrary user through a wirelessly linked user device.

Presuming there is a user in the environment attempting to determine his/her position using his/her mobile device, the mobile device will firstly measure the RSS from all surrounding WiFi access points within range and search the radio map for the RSS vector that is closest to the measured RSS vector. The positioning engine 1714 will then select the position of the closest RSS vector in the radio map as an estimate of the user's position. The RSS vectors could be the vectors containing the mean RSS in the CPs of the CP_LIST_2. For example, $Y_3$ 1408 and $Y_5$ 1406 in FIG. 14.

Although the radio map is to provide a one-to-one deterministic mapping between the position and the measurement result, due to human traffic and environmental changes (such as movement of furniture), this mapping becomes "noisy" and the relationship between position and measurement result becomes a probabilistic one. Hence, a channel variation model is used here to determine probabilistic relationship between the measured RSS vector and the true position. This model will capture the deviation of the measured RSS vector from that in the radio map, according to the time and day. The channel variation model refers to the Gaussian Probability Density Function (e.g. the formulas applied at step 1006 in FIG. 10 and at step 1504 in FIG. 15). It is appreciated that other types of PDFs may also be used, e.g. Laplace PDF, Uniform PDF and the like.

An accurate and robust channel variation model could be created by making measurements at different locations and times of the day, and correlating them with the corresponding human traffic conditions onsite. Once the position of a user is accurately determined, navigation services can be provided by searching for the nearest route between the user and the destination. This will be handled by the navigation engine. Suitable route finding algorithms are used at the navigation engine.

Advantageously, the system 1700 achieves indoor positioning by tapping on existing WiFi access points which are already deployed in the buildings for wireless data services. Hence, a dedicated WiFi access point deployment plan, direct control over the WiFi network, nor any dedicated infrastructure for these purposes are not required.

Furthermore, the system 1700 can advantageously be configured to push relevant information and data to the right user, at the right time, and at the right place. This intelligent selectivity will allow organizations to better manage their staff and information sharing.

It is also important in mobile location awareness marketing as it prevents a marketing overload which will, in the long run, cause users to turn away from the platform altogether. This accuracy in marketing is an improvement from current mobile marketing platforms, like iAd™ from Apple, which pushes advertisements through mobile apps without filtering.

Another group of mobile apps, such as Go! Shopping™, Sg Malls™ and Point Inside™, only provide maps and directory services without indoor positioning capabilities to determine building floor and position on the building floor.

In a hospital, it would be critical to keep track of where all the key medical staff and important medical equipment are at any point of time. Any time wasted in searching for the right person or equipment will seriously erode the survival probability of the patient. If the system 1700 is deployed in the hospital, it will be able to keep track of all equipment, personnel, medical staff and even patients. Through the Management Interface Module 1704, a system manager will be able to visualize the locations of all people and objects that are being tracked. In an emergency, the manager will be able to dispatch the nearest medical staff and equipment to attend to the patient.

The system 1700 can also be used as a productivity tool to improve workflows and processes as the system is able to measure key performance metrics like average response time, bed utilization rate, etc. If, for instance, a restaurant owner still has a few empty tables during lunchtime on a busy Saturday afternoon and he/she wants to fill up the restaurant to maximize revenue for the day. With the system 1700, he/she is able to push out promotions instantaneously to shoppers in the vicinity of the restaurant section of the mall, and also those users who have indicated "food and beverages" as one of their selected shopping preferences. This targeted group of shoppers is the most likely to be searching for a place for lunch. Upon receiving the promotion, interested shoppers will click on the "navigate" button and the system 1700 will show them the shortest path to get to the restaurant from their current locations. Thus, the system 1700 acts as a virtual bridge that directly and accurately connects the retailers with the relevant shoppers in a timely manner.

Advantageously, with the system 1700, shoppers may no longer need to trek through the whole mega mall to search for the best deals. All the information is instantly available (i.e. pushed to their activated mobile devices) at their fingertips. Furthermore, the system 1700 taps on the existing WiFi networks in the shopping malls to provide these indoor navigation and mobile marketing services. This will reduce infrastructure costs.

One application scenario of the system 100 is as follows.

To enjoy access to advertisements made available to smartphones in a building, consumers may download a mobile application into their smartphones from an Application Store (for iPhone™ users), Android™ Market (for Android™ phone users) or equivalents. Once a consumer has downloaded the application, he or she has to create an account on a proprietary server. The consumer will be uniquely identified by his or her username and password. He or she will be asked to fill in a form which consists of his or her personal particulars, shopping preferences, hobbies, etc. The only mandatory item could be a working email address. The rest of the items/particulars in the form could be made optional. When the consumer activates the mobile application on his or her smartphone, the application is able to estimate the consumer's building floor location and position on the building floor and this information is sent back to the proprietary server through a 3G/GPRS data link. With these location information, the proprietary server is then able to push relevant advertisements to the consumer, again through the 3G/GPRS data link, according to the time, location and preferences.

An example of how a graphical user interface (GUI) of the mobile application described with reference to FIG. 1 might be implemented on a smartphone is described as follows. It is appreciated that the GUI in different smartphones might be different but a few of the fundamental features will remain generally similar.

There could be the following fundamental features in the GUI.

A Functional button or an automatically activated feature for Searching: This button or feature links to a central directory where the consumer can search for specific retail outlets according to names or categories, search for specific ads from specific retail outlets, search for amenities, e.g. washrooms, Automated Teller Machine, etc.

A Functional button or an automatically activated feature for indicating what's around: This button or feature activates displaying of advertisements from outlets within a predetermined meter radius (can be user-defined) of the smartphone. Thus, this button will lead to advertisements which are displayed according to location. It is appreciated that the advertisements are not necessarily promotion of products or services, they could also contain any information intended to be shared.

A Functional button or an automatically activated feature for indicating what's happening at the present moment: This button or feature activates displaying of advertisements put up in a current time period of, for instance, in the past one hour. Thus, this button will lead to advertisements which are displayed according to time.

A Functional button or an automatically activated feature for indicating what's on when the consumer walks into a store: This button or feature may, for instance, shows advertisements provided by retailers offering product promotions to customers who physically walk into their stores.

A Functional button or an automatically activated feature for generating virtual points when the consumer walks into a store: This button or feature may reward customers who physically walk into their stores with points which can be exchanged for gifts or cash vouchers.

A Functional button or an automatically activated feature for indicating what's preferred by the consumer: This button or automatically activated feature shows advertisements from retailers who are on a preferred list defined by the consumer. When the consumer physically walks into a participating outlet, a system server will automatically push to the consumer's smartphone information specific to that outlet.

It is appreciated that other than pushing information specific to a current store that the consumer walks into, there are the following alternatives.

i) Push to the consumer an advertisement from a competitor of the current store entered.

ii) Push to the consumer an advertisement from a store that sells products complimentary to the current store. For example, if the consumer walks into a store selling business shirts, advertisement for another shop selling ties will be pushed to him or her.

iii) Push to the consumer special promotions if he or she has spent X amount of time in a particular Y department (e.g. children's department) of the store, where X and Y can be pre-defined by the retailer.

iv) Push to the consumer items in his or her personalized shopping list (which has been uploaded into a database server earlier) which can be bought from the current store.

v) Push to the consumer credit card promotions that are applicable to the current store.

A proposed solution for the system 100 described with reference to FIG. 1 may include two aspects. The first aspect is infrastructure for indoor detection, which has been described earlier with reference to FIGS. 1 to 17. The second aspect is location services developed to leverage on the detection capabilities of the system 100.

The second aspect may include four features as follows.

Way Finding Services:

Navigation & Routing—Provide a simple and convenient service to help shoppers triangulate their location in relation to the mail and assist shoppers in navigating their way within the mall.

Car Finder—Shoppers no longer need to worry about where they parked their cars. A Car Finder service automatically logs a nearest entrance/exit door from where the car was parked allowing the mobile application to guide the shopper back to the car.

Footfall Analytics:

Merchants are able to objectively evaluate the effectiveness of their marketing campaigns, the new store design/layout and quantitatively correlate to sales revenue. Through real-time monitoring of in-mall shopper's movements, mall owners can determine shopper's behaviour, movement patterns and popular routes through footfall analytics. The analytics platform will allow the mall-owner cloud access to real-time analytics information and reports, enabling a quick overview of the situation on the ground for high-level strategic decisions. Management can also analyse human traffic and footfall analytics reports to optimize rental yield.

Location-Based Advertising:

Real-time, shop level push advertising—Leveraging on indoor detection of shoppers and their profiles, the mobile application can intelligently push context-based advertising materials according to the shopper's exact location (5~10 m). Merchants can create and run location-based advertising campaigns to targeted shoppers enabling real-time intervention to increase sales.

Social Networking:

Family and Friend Finder—Riding on the popularity of social media, the mobile application will enable shoppers to share their real-time location with selected friends and family members. Such a feature will help facilitate the meeting of friends and also help families to track their children and grandparents.

A method covered by the description of FIGS. 1 to 17 may be described in another manner as follows.

Figure 18:
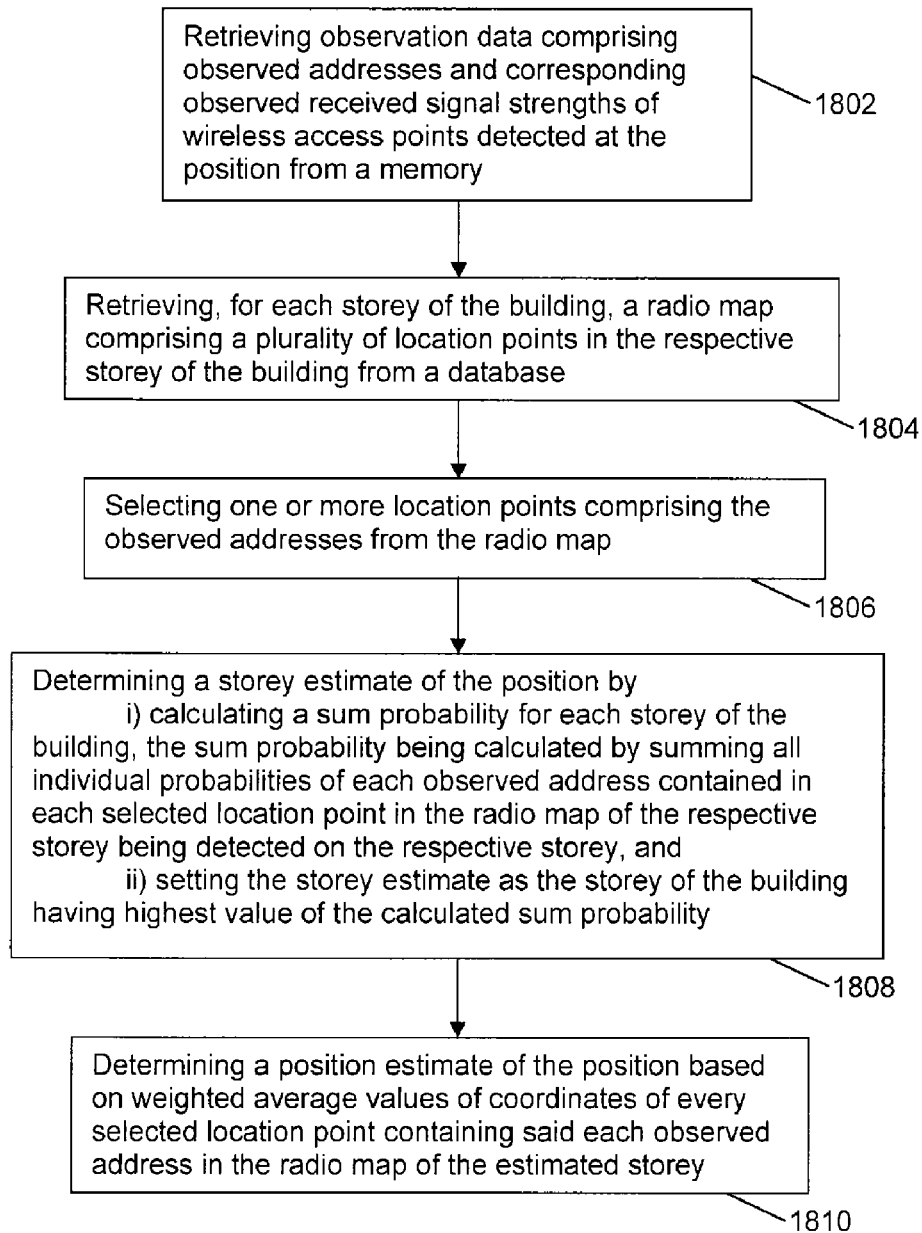
FIG. 18 shows a flowchart of an operation of an indoor positioning system.

With reference to FIG. 18, there is flowchart 1800 illustrating a method for determining location information of a position in a multi-storey building that comprises the following steps.

At step 1802, retrieving observation data comprising observed addresses and corresponding observed received signal strengths of wireless access points detected at the position from a memory (For example, this relates to steps 702 in FIG. 7, 902 in FIG. 9 and 1202 in FIG. 12).

Figure 10:
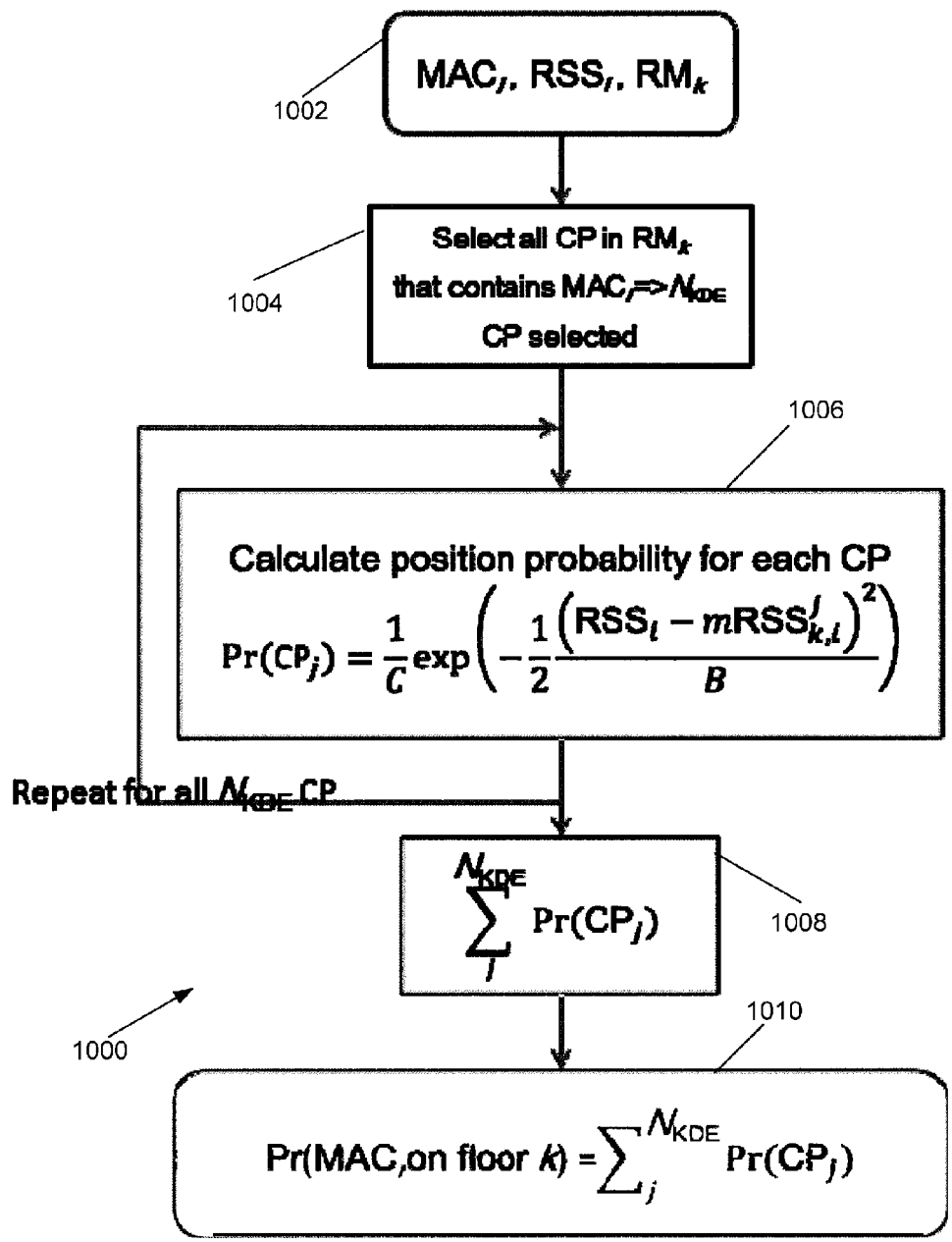
FIG. 10 shows a flowchart for calculating probability of an access point being observed on a floor of the multi-storey building.

At step 1804, retrieving, for each storey of the building, a radio map (For example, 412 in FIG. 4) comprising a plurality of location points in the respective storey of the building from a database, each location point comprising addresses and corresponding mean received signal strengths of wireless access points detected at the location point and coordinates of the location point (For example, this relates to steps 708 in FIG. 7, 1002 in FIG. 10, 1112 in FIG. 11 and 1502 in FIG. 15).

At step 1806, selecting one or more location points comprising the observed addresses from the radio map (For example, this relates to step 1004 in FIG. 10).

At step 1808, determining a storey estimate of the position by calculating a sum probability for each storey of the building, the sum probability being calculated by summing all individual probabilities of each observed address contained in each selected location point in the radio map of the respective storey being detected on the respective storey, and setting the storey estimate as the storey of the building having highest value of the calculated sum probability, wherein each of said individual probabilities is calculated based on the corresponding observed received signal strength of said each observed address in said each selected location point and the corresponding mean received signal strength in said each selected location point containing said each observed address (For example, this relates to the steps in FIGS. 9 and 10).

The method may further comprise at step 1810, determining a position estimate of the position based on weighted average values of coordinates of every selected location point containing said each observed address in the radio map of the estimated storey (For example, this relates to the steps in FIG. 15).

The selected one or more location points may be selected from a filtered region of interest in the radio map in the step of selecting one or more location points comprising the observed addresses from the radio map (For example, this relates to the creation of CP_LIST_1 described with reference to 1212 in FIG. 12).

The method may further comprise extracting a number of observed addresses with corresponding received signal strengths above a predetermined value (For example, this relates to the creation of AP_LIST described with reference to 1210 in FIG. 12).

The observed addresses that are not extracted may be removed from the selected one or more location points (For example, this relates to the creation of CP_LIST_2 described with reference to 1214 in FIG. 12).

The region of interest in the radio map may be filtered based on vicinity of a previous position in a multi-storey building (For example, this relates to steps 1102 and 1104 in FIG. 11).

The step of determining a storey estimate of the position may comprise the following steps.

Firstly, calculating, using a Probability Density Function, a first value indicative of probability of a first selected location of the selected location points being the position of the mobile device, based on the corresponding observed received signal strength of a first observed address in the first selected location point and the corresponding mean received signal strength in the first selected location point containing the first observed address, and secondly, calculating the first value for each one of the selected location points (For example, this relates to step 1006 in FIG. 10).

Thirdly, summing up first values calculated for the selected location points in the radio map of one storey, wherein said selected location points all contain a common observed address, to get a second value and fourthly, calculating the second value for every observed address that is common (For example, this relates to step 1008 in FIG. 10).

Fifthly, summing up second values calculated for each storey of the building to get a third value (For example, step 910 in FIG. 9) and sixthly, selecting the largest third value as the storey estimate (For example, this relates to step 912 in FIG. 9).

The method may further comprise selecting the observed addresses with variance of detected received signal strengths that is beyond a predetermined variance from the radio map of each storey in the building and in the step of selecting one or more location points comprising the observed addresses from the radio map, selecting the one or more location points comprising the selected observed addresses with variance of detected received signal strengths that is beyond the predetermined variance (For example, this relates to step 904 in FIG. 9).

The method may further comprise receiving observation data wirelessly from a mobile device located at the position in the building, the observation data comprising observed addresses and corresponding observed received signal strengths of wireless access points detected by the mobile device at the position (For example, step 902 and covering the case where the method is performed by a server such as the database server 106 in FIG. 1).

The method may further comprise detecting observation data at the position, the observation data comprising observed addresses and corresponding observed received signal strengths of wireless access points detected [For example, step 902 and covering the case where the method is performed by a mobile device (For example, 102 in FIG. 1) and also the case where the mobile device (For example, 102 in FIG. 1) is acting as a server like, for instance, database server 106 in FIG. 1.

The method may further comprise repeating said step of determining the storey estimate a predetermined number of times based on more than one observation data to collect more than one preliminary storey estimate and selecting as the storey estimate the same storey having the largest third value in the predetermined number of times (For example, this relates to the steps in FIG. 8).

An apparatus covered by the description of FIGS. 1 to 17 may be described in another manner as follows.

An apparatus for determining location information of a position in a multi-storey building that comprises the following components.

Firstly, a memory [For example, a memory (flash memory, hard disc drive, and the like) residing in the mobile device 102 in FIG. 1, RAM 1620 in FIG. 20 and data storage 1630 in FIG. 16] for storing observation data comprising observed addresses and corresponding observed received signal strengths of wireless access points detected at the position (For example, step 902 in FIG. 9).

Secondly, a database (For example, 1630 in FIG. 16) for storing, for each storey of the building, a radio map (For example, 412 in FIG. 4) of a plurality of location points in the respective storey of the building, each location point comprising addresses and mean corresponding received signal strengths of wireless access points detected at the location point and coordinates of the location point (For example, this relates to steps 708 in FIG. 7, 1002 in FIG. 10, 1112 in FIG. 11 and 1502 in FIG. 15).

Thirdly, a processing unit (For example, 1602 in FIG. 16) for selecting one or more location points comprising the observed addresses from the radio map (For example, this relates to step 1004 in FIG. 10).

The processing unit (For example, 1602 in FIG. 16) may be configured for determining a storey estimate of the position by calculating a sum probability for each storey of the building, the sum probability being calculated by summing all individual probabilities of each observed address contained in each selected location point in the radio map of the respective storey being detected on the respective storey, and setting the storey estimate as the storey of the building having highest value of the calculated sum probability, wherein each of said individual probabilities is calculated based on the corresponding observed received signal strength of said each observed address in said each selected location point and the corresponding mean received signal strength in said each selected location point containing said each observed address (For example, this relates to the steps in FIGS. 9 and 10).

The processing unit (For example, 1602 in FIG. 16) may be further configured for determining a position estimate of the position based on weighted average values of coordinates of every selected location point containing said each observed address in the radio map of the estimated storey (For example, this relates to the steps in FIG. 15).

The selected one or more location points may be selected from a filtered region of interest in the radio map in the step of selecting one or more location points comprising the observed addresses from the radio map (For example, this relates to the creation of CP_LIST_1).

The processing unit (For example, 1602 in FIG. 16) may be further configured for extracting a number of observed addresses with corresponding received signal strengths above a predetermined value (For example, this relates to the creation of AP_LIST).

The observed addresses that are not extracted may be removed from the selected one or more location points (For example, this relates to the creation of CP_LIST_2).

The region of interest in the radio map (For example, 412 in FIG. 4) may be filtered based on vicinity of a previous position in a multi-storey building (For example, this relates to steps 1102 and 1104).

The step of determining a storey estimate of the position may comprise the steps as follows.

The step of determining a storey estimate of the position may comprise the following steps.

Firstly, calculating, using a Probability Density Function, a first value indicative of probability of a first selected location of the selected location points being the position of the mobile device, based on the corresponding observed received signal strength of a first observed address in the first selected location point and the corresponding mean received signal strength in the first selected location point containing the first observed address, and secondly, calculating the first value for each one of the selected location points (For example, this relates to step 1006 in FIG. 10).

Thirdly, summing up first values calculated for the selected location points in the radio map of one storey, wherein said selected location points all contain a common observed address, to get a second value and fourthly, calculating the second value for every observed address that is common (For example, this relates to step 1008 in FIG. 10).

Fifthly, summing up second values calculated for each storey of the building to get a third value (For example, this relates to step 910 in FIG. 9) and sixthly, selecting the largest third value as the storey estimate (For example, this relates to step 912 in FIG. 9).

The processing unit (For example, 1602 in FIG. 16) may be further configured for selecting the observed addresses with variance of detected received signal strengths that is beyond a predetermined variance from the radio map of each storey in the building and in the step of selecting one or more location points comprising the observed addresses from the radio map, selecting the one or more location points comprising the selected observed addresses with variance of detected received signal strengths that is beyond the predetermined variance (For example, this relates to step 904 in FIG. 9).

The apparatus may comprise a receiver (For example, 1632 in FIG. 16) for receiving the observation data wirelessly from a mobile device located at the position in the building i.e. the apparatus may be a server (For example, database server 106 in FIG. 1).

The apparatus may comprise a detector (For example, 1632 in FIG. 16) for detecting the observation data from the position i.e. the apparatus may be a mobile device (For example, 102 in FIG. 1) and also the case where the mobile device (For example, 102 in FIG. 1) is acting as a server like, for instance, database server 106 in FIG. 1.

The processing unit (For example, 1602 in FIG. 16) may be further configured for repeating said step of determining the storey estimate a predetermined number of times based on more than one observation data to collect more than one preliminary storey estimate; and selecting as the storey estimate the same storey having the largest third value in the predetermined number of times (For example, this relates to the steps in FIG. 8).

Many modifications and other examples can be made to the method and apparatus for determining location information of a position in a multi-storey building by those skilled in the art having the understanding of the above described disclosure together with the drawings. Therefore, it is to be understood that the method and apparatus for determining location information of a position in a multi-storey building is not to be limited to the above description contained herein only, and that possible modifications are to be included in the claims of the disclosure.

The invention claimed is:

1. A method for determining location information of a position in a multi-storey building, the method comprising:
    retrieving observation data comprising observed addresses and corresponding observed received signal strengths of wireless access points detected at the position from a memory;
    retrieving, for each storey of the building, a radio map comprising a plurality of location points in the respective storey of the building from a database, each location point comprising addresses and corresponding mean received signal strengths of wireless access points detected at the location point and coordinates of the location point;
    selecting one or more location points comprising the observed addresses from the radio map;
    determining a storey estimate of the position by
    calculating a sum probability for each storey of the building, the sum probability being calculated by summing all individual probabilities of each observed address contained in each selected location point in the radio map of the respective storey being detected on the respective storey; and
    setting the storey estimate as the storey of the building having highest value of the calculated sum probability,
    wherein each of said individual probabilities is calculated based on the corresponding observed received signal strength of said each observed address in said each selected location point and the corresponding mean received signal strength in said each selected location point containing said each observed address.

2. The method as claimed in claim 1, the method further comprising:
    determining a position estimate of the position based on weighted average values of coordinates of every selected location point containing said each observed address in the radio map of the estimated storey.

3. The method as claimed in claim 1, wherein said selected one or more location points are selected from a filtered region of interest in the radio map in the step of selecting one or more location points comprising the observed addresses from the radio map.

4. The method as claimed in claim 3, wherein the region of interest in the radio map is filtered based on vicinity of a previous position in a multi-storey building.

5. The method as claimed in claim 1, the method further comprising:
    extracting a number of observed addresses with corresponding received signal strengths above a predetermined value.

6. The method as claimed in claim 5, wherein the observed addresses that are not extracted are removed from the selected one or more location points.

7. The method as claimed in claim 1, the step of determining a storey estimate of the position comprising:
    calculating, using a Probability Density Function, a first value indicative of probability of a first selected location of the selected location points being the position of the mobile device, based on the corresponding observed received signal strength of a first observed address in the first selected location point and the corresponding mean received signal strength in the first selected location point containing the first observed address;
    calculating the first value for each one of the selected location points;
    summing up first values calculated for the selected location points in the radio map of one storey, wherein said selected location points all contain a common observed address, to get a second value; and
    calculating the second value for every observed address that is common;
    summing up second values calculated for each storey of the building to get a third value; and
    selecting the largest third value as the storey estimate.

8. The method as claimed in claim 7, the method further comprising:
    repeating said step of determining the storey estimate a predetermined number of times based on more than one observation data to collect more than one preliminary storey estimate; and
    selecting as the storey estimate the same storey having the largest third value in the predetermined number of times.

9. The method as claimed in claim 1, the method further comprising:
    selecting the observed addresses with variance of detected received signal strengths that is beyond a predetermined variance from the radio map of each storey in the building; and in the step of selecting one or more location points comprising the observed addresses from the radio map, selecting the one or more location points comprising the selected observed addresses with variance of detected received signal strengths that is beyond the predetermined variance.

10. The method as claimed in claim 1, the method further comprising:
    receiving observation data wirelessly from a mobile device located at the position in the building, the observation data comprising observed addresses and corresponding observed received signal strengths of wireless access points detected by the mobile device at the position.

11. The method as claimed in claim 1, the method further comprising:
    detecting observation data at the position, the observation data comprising observed addresses and corresponding observed received signal strengths of wireless access points detected.

12. An apparatus for determining location information of a position in a multi-storey building, the apparatus comprising:
    a memory for storing observation data comprising observed addresses and corresponding observed received signal strengths of wireless access points detected at the position;
    a database for storing, for each storey in the building, a radio map comprising a plurality of location points in the respective storey of the building, each location point comprising addresses and mean corresponding received signal strengths of wireless access points detected at the location point and coordinates of the location point; and a processing unit for selecting one or more location points comprising the observed addresses from the radio map;

the processing unit being configured for determining a storey estimate of the position by calculating a sum probability for each storey of the building, the sum probability being calculated by summing all individual probabilities of each observed address contained in each selected location point in the radio map of the respective storey being detected on the respective storey, and setting the storey estimate as the storey of the building having highest value of the calculated sum probability, wherein each of said individual probabilities is calculated based on the corresponding observed received signal strength of said each observed address in said each selected location point and the corresponding mean received signal strength in said each selected location point containing said each observed address.

13. The apparatus as claimed in claim 12, the processing unit being further configured for determining a position estimate of the position based on weighted average values of coordinates of every selected location point containing said each observed address in the radio map of the estimated storey.

14. The apparatus as claimed in claim 12, wherein said selected one or more location points are selected from a filtered region of interest in the radio map in the step of selecting one or more location points comprising the observed addresses from the radio map.

15. The apparatus as claimed in claim 14, wherein the region of interest in the radio map is filtered based on vicinity of a previous position in a multi-storey building.

16. The apparatus as claimed in claim 12, the processing unit is further configured for extracting a number of observed addresses with corresponding received signal strengths above a predetermined value.

17. The apparatus as claimed in claim 16, wherein the observed addresses that ace not extracted are removed from the selected one or more location points.

18. The apparatus as claimed in claim 12, the step of determining a storey estimate of the position comprising:

calculating, using a Probability Density Function, a first value indicative of probability of a first selected location of the selected location points being the position of the mobile device, based on the corresponding observed received signal strength of a first observed address in the first selected location point and the corresponding mean received signal strength in the first selected location point containing the first observed address;

calculating the first value for each one of the selected location points;

summing up first values calculated for the selected location points in the radio map of one storey, wherein said selected location points all contain a common observed address, to get a second value;

calculating the second value for every observed address that is common; summing up second values calculated for each storey of the building to get a third value; and selecting the largest third value as the storey estimate.

19. The apparatus as claimed in claim 18, the processing unit being further configured for repeating said step of determining the storey estimate a predetermined number of times based on more than one observation data to collect more than one preliminary storey estimate; and selecting as the storey estimate the same storey having the largest third value in the predetermined number of times.

20. The apparatus as claimed in claim 12, the processing unit being further configured for selecting the observed addresses with variance of detected received signal strengths that is beyond a predetermined variance from the radio map of each storey in the building; and in the step of selecting one or more location points comprising the observed addresses from the radio map, selecting the one or more location points comprising the selected observed addresses with variance of detected received signal strengths that is beyond the predetermined variance.

21. The apparatus as claimed in claim 12, the apparatus comprising:

a receiver for receiving the observation data wirelessly from a mobile device located at the position in the building.

22. The apparatus as claimed in claim 12, the apparatus comprising:

a detector for detecting the observation data from the position.

* * * * *

UNITED STATES PATENT AND TRADEMARK OFFICE
CERTIFICATE OF CORRECTION

PATENT NO. : 8,385,943 B1
APPLICATION NO. : 13/505656
DATED : February 26, 2013
INVENTOR(S) : Han et al.

It is certified that error appears in the above-identified patent and that said Letters Patent is hereby corrected as shown below:

In the Specifications

In column 6, line 56, after "together", insert --,-- therefor

In column 8, line 4 (Approx.), delete " $\forall \in N_i$," and insert -- $\forall n \in N_i$, -- therefor In column 9, line 57, delete "MAC;" and insert --$MAC_i$-- therefor In column 13, line 8, delete "MAC;" and insert --$MAC_i$-- therefor In column 13, line 49 (Approx.), after "Floor 1", insert --)-- therefor In column 13, line 51 (Approx.), after "Floor 2", insert --)-- therefor In column 13, line 54 (Approx.), after "Floor $k$", insert --)-- therefor In column 14, line 39, delete "MAC;" and insert --$MAC_i$-- therefor In column 14, line 65, before "is", delete "that", therefor In column 15, line 26, delete "MAC;" and insert --$MAC_i$-- therefor In column 18, line 36, delete " $\hat{r}$ " and insert -- $\hat{r}$ -- therefor In column 18, line 66, delete "Densuty", insert --Density-- therefor Signed and Sealed this
Sixth Day of August, 2013

Teresa Stanek Rea
*Acting Director of the United States Patent and Trademark Office*

CERTIFICATE OF CORRECTION (continued)
U.S. Pat. No. 8,385,943 B1

In column 19, line 2 (Approx.), after "$C = 2\pi^{(\frac{d_{APS}}{2})}[\det(\text{cov})]^{(\frac{1}{2})}$" insert --and $B = cov$--, therefor In column 19, line 55, delete "$\hat{y}_{prev}$" and insert -- $\hat{r}_{prev}$ --, therefor In column 20, line 1, delete "hence.", insert --hence,--, therefor In column 20, line 23, delete "$\hat{y}$" and insert -- $\hat{r}$ --, therefor In column 20, line 37, after "contained", insert --in--, therefor In column 23, line 2, delete "Such", insert --This--, therefor In column 23, line 63, delete "RE" and insert --RF--, therefor In column 25, line 24, delete "day. With", insert --day, with--, therefor In column 25, line 27, before "those", insert --to--, therefor In column 29, line 17, after "FIG. 1", insert --]--, therefor In column 29, line 32, delete "20" and insert --16--, therefor In the Claims In column 33, line 43, in claim 17, delete "ace" and insert --are--, therefor In column 34, line 15, in claim 18, after "common;" insert --¶--, therefor